United States Patent [19]

Kato et al.

[11] Patent Number: 5,719,986
[45] Date of Patent: Feb. 17, 1998

[54] VIDEO SIGNAL ENCODING METHOD

[75] Inventors: Motoki Kato; Takashi Kojima, both of Kanagawa, Japan

[73] Assignee: Sony Corporation, Tokyo, Japan

[21] Appl. No.: 641,491

[22] Filed: May 1, 1996

[30] Foreign Application Priority Data

May 2, 1995 [JP] Japan .................................. 7-108860
Nov. 29, 1995 [JP] Japan .................................. 7-311418

[51] Int. Cl.$^6$ .............................. H04N 5/92; H04N 7/32
[52] U.S. Cl. .......................... 386/109; 386/111; 348/384; 348/390
[58] Field of Search .................... 348/384, 390–394, 348/396, 400, 401–403, 405, 409, 410–413, 415, 416, 420, 699; 382/232, 236, 238; 386/109, 111, 112, 33; H04N 7/130, 7/137, 5/92, 5/76, 9/79

[56] References Cited

U.S. PATENT DOCUMENTS

| | | | |
|---|---|---|---|
| 5,237,397 | 8/1993 | Mighdoll et al. | 348/391 |
| 5,291,282 | 3/1994 | Nakagawa et al. | 348/384 |
| 5,424,778 | 6/1995 | Sugiyama et al. | 348/390 |
| 5,432,556 | 7/1995 | Hatano et al. | 348/390 |
| 5,502,491 | 3/1996 | Sugiyama et al. | 348/390 |
| 5,506,686 | 4/1996 | Auyeung et al. | 348/384 |
| 5,576,766 | 11/1996 | Matsumoto et al. | 348/384 |

*Primary Examiner*—Thai Tran
*Attorney, Agent, or Firm*—William S. Frommer; Alvin Sinderbrand

[57] ABSTRACT

A method for encoding video signals including a first step of generating the information on picture characteristics at least including the luminance information of the input video signals in terms of a pre-set time interval as a unit, a second step of calculating the mean bit rate of the input video signals, a third step of calculating the information on the amount of bits generated per pre-set time interval of the input video signals, a fourth step of calculating the encoding difficulty per pre-set time interval based upon the information on picture characteristics, information on the amount of generated bits and the information on the total amount of usable data, a fifth step of determining the encoding bit rate per pre-set time interval by applying the encoding difficulty to a function for finding the encoding bit rate pre-set by the mean bit rate and a sixth step of encoding the input video signals in accordance with the encoding bit rate obtained per said pre-set time interval.

11 Claims, 16 Drawing Sheets

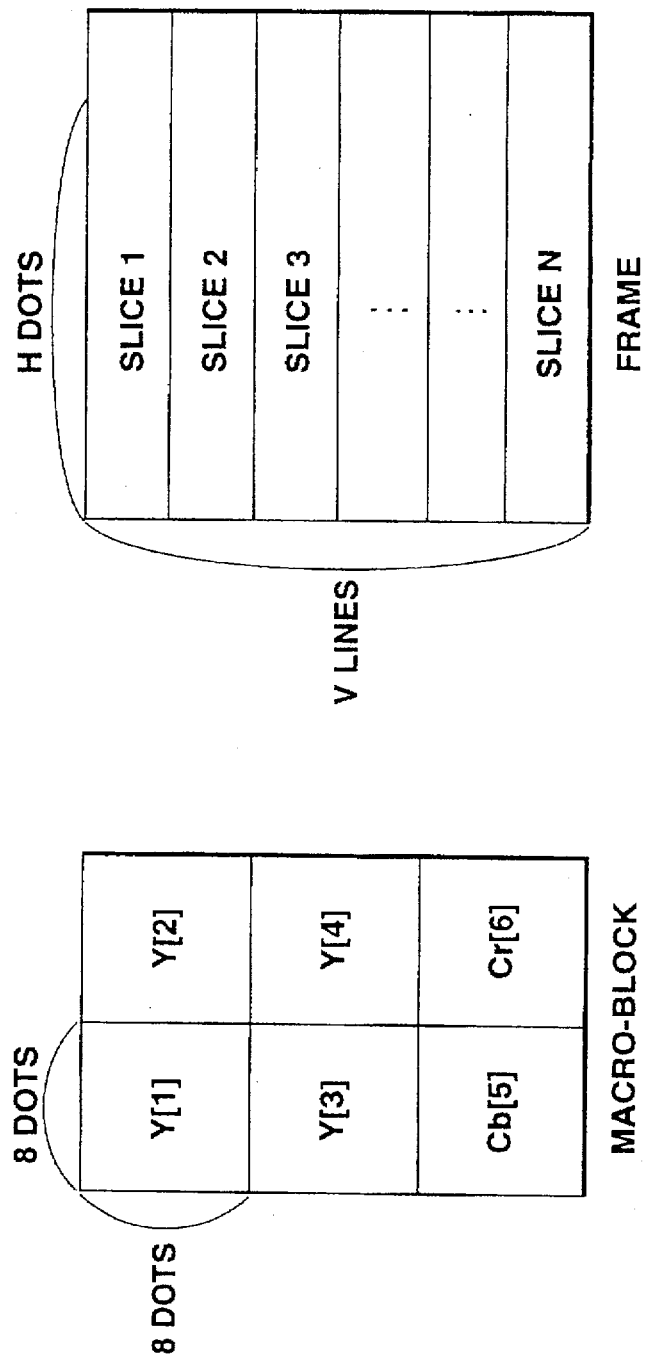
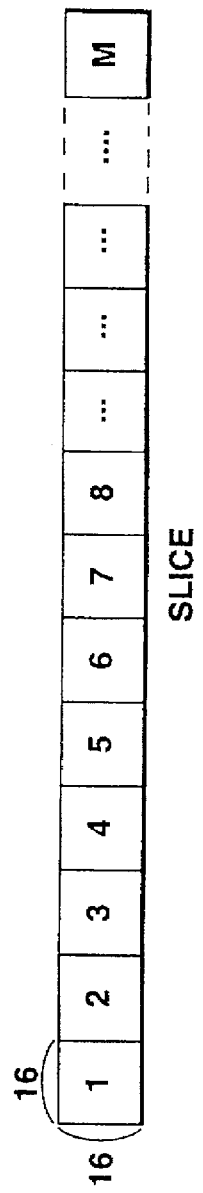
FIG. 5A
FIG. 5B
FIG. 5C

VIDEO SIGNAL ENCODING METHOD

BACKGROUND OF THE INVENTION

This invention relates to a picture encoding method, a picture encoding apparatus and a picture recording medium. More particularly, it relates to a picture encoding method and apparatus and a picture recording medium employed in a system for encoding video signals of a motion picture for storage on a picture recording medium, such as an optical disc, a magnetic disc or a magnetic tape, or in a system employed for transmitting video signals of a moving picture over a transmission channel.

FIG. 1 shows an encoder in which data is compressed as intra-frame coding exploiting line correlation is switched to inter-frame coding exploiting inter-frame correlation or vice versa for improving the transmission efficiency. With the present encoder, prediction of motion compensation is executed on, for example, the macro-block basis for further improving the efficiency.

FIG. 2 shows a decoder as a counterpart device of the encoder of FIG. 1. By employing this decoder, data encoded by high efficiency encoding can be reproduced appropriately. With the above encoder, the encoding bit rate of a bitstream generated in an encoder 75 is constant for meeting with the transfer rate of a transmission medium 90. The amount of generated data, that is the quantization step size of a quantizer 106, is controlled under these restrictions. Stated differently, if plural pictures with complex patterns occur contiuously, the quantization step size is increased fop suppressing the amount of generated data, whereas, if plural picture of simple patterns occur contiguously, the quantization step size is decreased for increasing the amount of generated data for prohibiting overflow or underflow of a buffer memory 109 for maintaining a fixed rate.

If, with the above encoder, complex pictures occur contiguously, the quantization step size is increased, thus deteriorating the picture quality, whereas, if simple pictures occur contiguously, the quantized step size is decreased, so that, on the whole, the uniform picture quality cannot be obtained.

On the other hand, for recording a bitstream on a picture recording medium having a limited data capacity, a high fixed rate which will not impair the picture quality has to be applied comprehensively for avoiding deterioration of the complex picture quality, thus decreasing the recording time.

There are also occasions wherein, even if the degree of picture complexity remains the same, the encoded picture gives a poor subjective impression as to the picture quality depending upon the picture patterns owing to characteristics of the visual sense of the human being. For example, the encoding noise, such as block noise or mosquito noise, become apparent in dark portions, red portions or flat portions of a picture.

It is proposed in U.S. Ser. No. 08/428,841 by the same Assignee to find the amount of the allocated codes per pre-set time before actually encoding the input signal and to calculate the encoding bit rate per pre-set time within a range not exceeding the total usable data volume as set for a particular recording medium before actually recording the input signal. This is what is called a two-pass encoding method in which a sequence of input signals, for example, an entire motion picture, is encoded in its entirety for calculating the encoding bit rate. Thus a time length exceeding the time for one sequence is required before starting actual encoding, such that a time length longer than two Sequences is required for generating a bitstream for encoding data for ultimate transmission or recording.

The above applies to handling video signals of moving pictures. However, similar problems are presented for input audio signals, title data or character data.

SUMMARY OF THE INVENTION

It is therefore an object of the present invention to provide a signal encoding method, a signal encoding apparatus and a signal recording medium in which encoded data of uniform and superior quality may be produced, longtime recording may be achieved and input signals may be encoded substantially on the real-time basis.

It is another object of the present invention to provide a signal encoding method, a signal encoding apparatus and a signal recording medium in which input video signals may be encoded in such a manner as to reflect characteristics of the visual sense of the human being and to render the encoding noise less apparent.

According to the present invention, there is provided a method for encoding video signals including a first step of generating the information on picture characteristics at least including the luminance information of the input video signals per a pre-set time interval as a unit, a second step of calculating the mean bit rate of the input video signals, a third step of calculating the information on the amount of bits generated per pre-set time interval of the input video signals, a fourth step of calculating the encoding difficulty per pre-set time interval based upon the information on picture characteristics, information on the amount of generated bits and the information on the total amount of data usable for transmission of encoded data, a fifth step of determining the encoding bit rate per pre-set time interval by applying the encoding difficulty to a function designed for finding the encoding bit rate pre-set by the mean bit rate, and a sixth step of encoding the input video signals in accordance with the encoding bit rate obtained per pre-set time interval.

The information on the amount of generated bits is found based upon the amount of data per pre-set time interval of the encoded data generated by encoding at least a part of the input video signals.

The information on picture characteristics is found by calculating at least one of picture luminance, chromaticity, flatness and picture movement every pre-set time interval.

The information on picture characteristics includes an average value of luminance signals as the information on picture luminance over the pre-set time interval, an average value of chroma signals as the chromaticity information over the pre-set time interval, a variance of the luminance signal as the information on flatness and an average value of the amounts of the motion vector of macro-blocks as the picture movement information over the pre-set time interval.

The information on the amount of bits of the input video signals generated per pre-set time interval is estimated from the inter-picture difference information represented by the square sum or the sum of absolute values per pre-set time interval of prediction residuals between pictures referred to in finding the picture movement.

BRIEF DESCRIPTION OF THE DRAWINGS

FIGS. 5A, 5B and 5C illustrate a frame construction, a slice construction and a macro-block construction, respectively.

DESCRIPTION OF PREFERRED EMBODIMENTS

Figure 1:
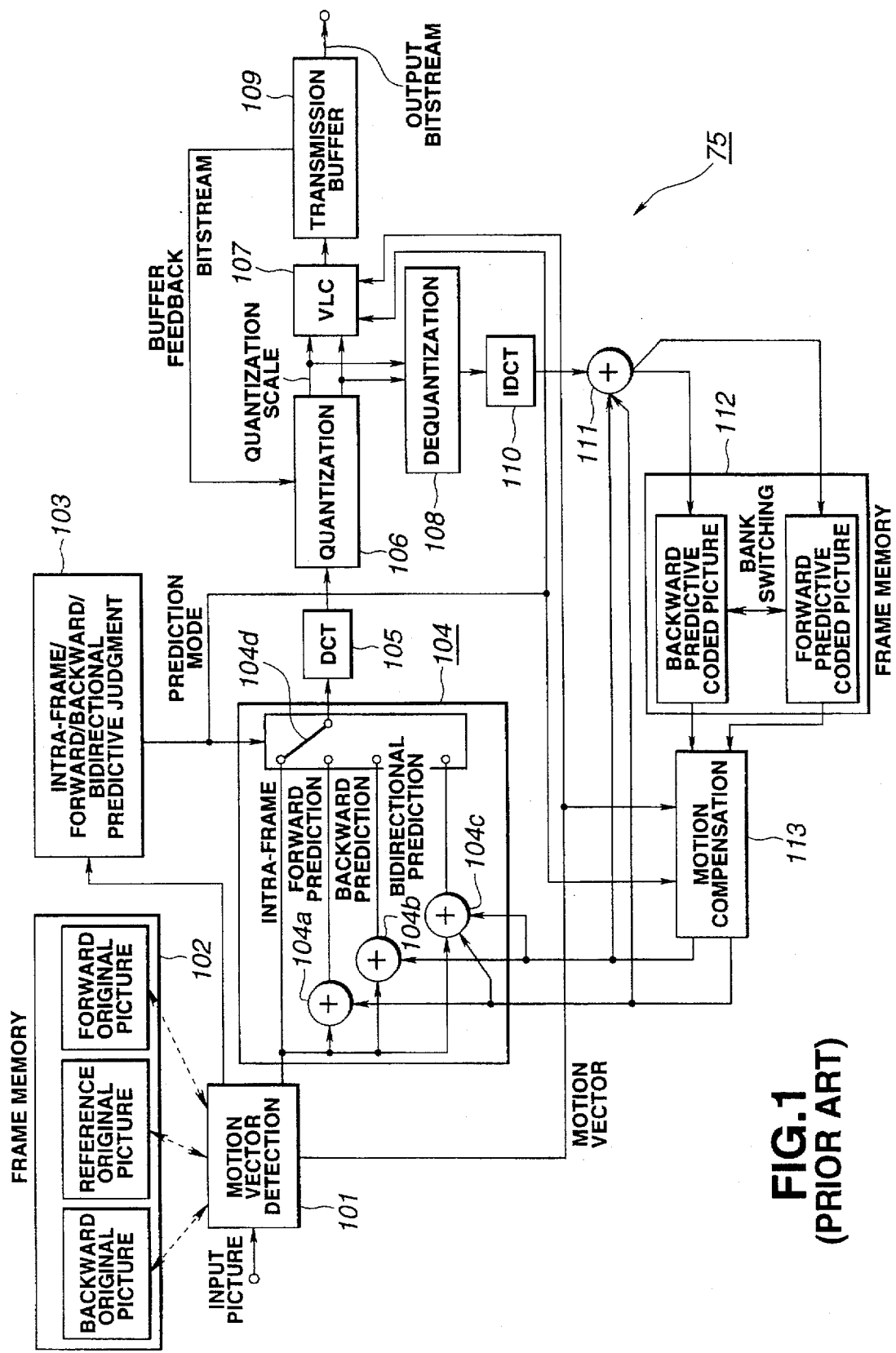
FIG. 1 is a block diagram showing an example of a conventional encoder circuit configuration.

Referring to the drawings, certain preferred embodiments of a picture encoding method, a picture encoding apparatus and a picture recording medium will be explained in detail.

In the following embodiments, description is made of the method and the apparatus for encoding picture signals and video signals and the recording medium. However, the present invention is not limited thereto and may be applied to encoding audio signals or to encoding of title data or character data.

(1) First Embodiment

Figure 3:
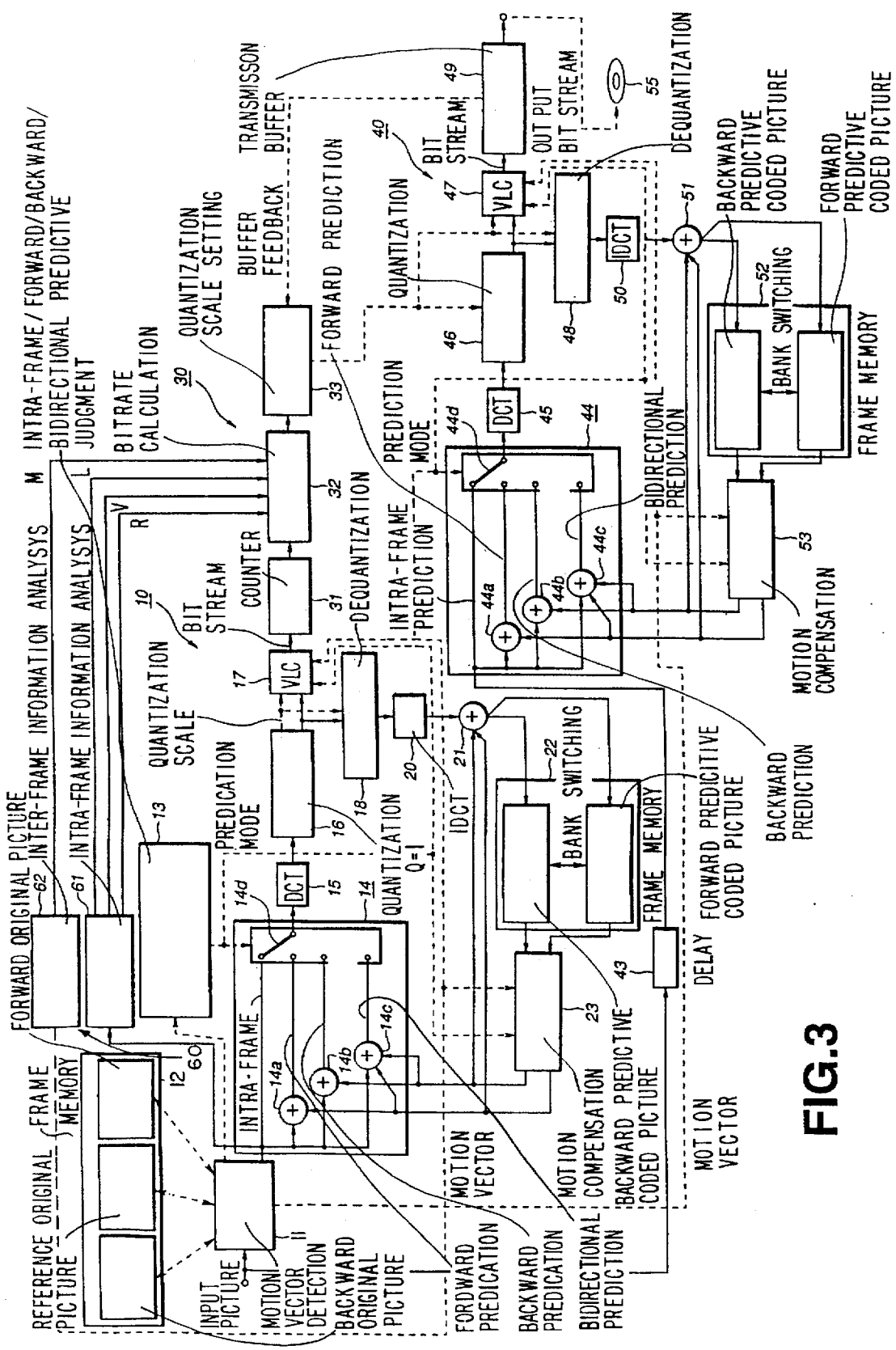
FIG. 3 is a block diagram showing a circuit structure showing essential portions of a picture encoding apparatus according to a first embodiment of the present invention.

Referring to FIG. 3, the picture encoding apparatus according to a first embodiment of the present invention includes a first encoding circuit 10 for encoding input video signals for generating first encoded data and a picture analysis circuit 60 for finding statistic properties or picture characteristics of input video signals. The picture encoding apparatus also includes an encoding control circuit 30 for finding the encoding rate every pre-set time interval based upon the amount of the first encoding data from the first encoding circuit 10 every pre-set time interval, statistic data or the information on picture characteristics from the picture analysis circuit 60 and the total amount of usable data. The picture encoding apparatus further includes a second encoding circuit 40 encoding the input video signals every pre-set time interval based upon the encoding rate from the encoding control circuit 30 for generating second encoded data.

Referring to FIG. 3, the picture analysis circuit 60 includes an intra-frame information analysis circuit 61 and an inter-frame information analysis circuit 61. The intra-frame information analysis circuit 61 calculates the statistic information on luminance, chroma or flatness, for example, as the information on input picture characteristics. The inter-frame information analysis circuit 62 calculates the statistic information on the amount of movement of the moving picture, for example, as the information on input picture characteristics.

By way of illustrative examples of the information on the picture characteristics, a mean value L of a luminance signal Y over a pre-set time interval is calculated as the statistic information on the luminance of the input picture, while a mean value R of the chroma signal Cr over a pre-set time interval is calculated as the statistic information on the chromaticity of the input picture. On the other hand, a variance V of the luminance signal Y every pre-set time interval is calculated as the statistic information of flatness of the input picture, while a mean value M of the motion vector over a pre-set time interval is calculated as the statistic information of the amount of movement of the input picture.

Referring to FIG. 3, the first encoding circuit 10 includes a set of frame memories 12 for storing input picture data as input picture signals, and a motion vector detection circuit 11 for detecting the motion vector of input picture data based upon picture data stored in the set of frame memories 12. The first encoding circuit 10 also includes a frame memory 22 for storing prediction picture data and a motion compensation circuit 23 for motion-compensating the prediction picture data read out from the frame memory 22 based upon the motion vector from the motion vector detection circuit 11. The first encoding circuit 10 also includes a predictive encoding circuit 14 for predictive encoding input picture data based upon motion-compensated prediction picture data from the motion compensation circuit 23, and a discrete cosine transform (DCT) circuit 15 for encoding prediction errors from the predictive encoding circuit 14 by DCT for generating coefficient data. The first encoding circuit 10 also includes a quantization circuit 16 quantizing the coefficient data from the DCT circuit 15 at a pre-set quantization step size for generating quantized data. The first encoding circuit 10 also includes a variable length encoding (VLC) circuit 17 for variable length encoding the quantized data from the quantization circuit 16 for outputting variable length encoded data. The first encoding circuit 10 also includes a dequantization circuit 18 for dequantizing the quantized data from the quantization circuit 16 for generating coefficient data. The first encoding circuit 10 also includes an inverse discrete cosine transform (IDCT) circuit 20 for decoding the coefficient data from the dequantization circuit 18 by IDCT for regenerating the differences. The first encoding circuit 10 also includes an addition circuit for summing the differences from the IDCT circuit 20 to the motion-compensated prediction picture data from the motion compensation circuit 23 for generating prediction picture data for the next input picture data and for supplying the prediction picture data to the frame memory 22.

Referring to FIG. 3, the second encoding circuit 40 includes a delay unit 43 for delaying input video data, and a frame memory 52 for storing prediction picture data. The second encoding circuit 40 also includes a motion compensation circuit 53 for motion-compensating the prediction picture data read out from the frame memory 52 on the basis of the motion vector from the motion vector detection circuit 11, and a predictive encoding circuit 44 for prediction coding input picture data delayed by the delay element 43. The second encoding circuit 40 also includes a DCT circuit 45 for encoding and discrete cosine transforming the differences from the prediction coding circuit 44 for generating coefficient data and a quantization scale setting circuit 33 for setting the quantization step size based upon the encoding rate from the encoding controlling circuit 30. The second encoding circuit 40 also includes a quantization circuit 46 for quantizing the coefficient data from the DCT circuit 45 with the quantization step size from the quantization scale setting circuit 33 for generating quantized data, and a variable length encoding circuit 47 for variable length encoding the quantized data from the quantization circuit 46 for outputting variable length encoded data. The second encoding circuit 40 also includes a transmission buffer memory 49 for transiently storing variable length encoded data from the variable length encoding circuit 47 for outputting the stored data at a pe-set bit rate, and a dequantization circuit 48 for dequantizing the quantized data from the quantization circuit 46 for reproducing the coefficient data. The second encoding circuit 40 also includes an IDCT circuit 50 for decoding the coefficient data from the dequantization circuit 48 by IDCT for reproducing the differences. The second encoding circuit 40 further includes an addition circuit 51 for summing the differences from the IDCT circuit 50 to the motion-compensated prediction picture data from the motion compensation circuit 53 to generate prediction picture data for the next input picture data and for supplying the prediction picture data to the frame memory 52.

With the present picture encoding apparatus, the first encoding circuit 10 processes input picture data by encoding, for example, predictive encoding, DCT, quantization at a pre-set quantization step size or variable length encoding. The second encoding circuit 40 then encodes the data based upon an encoding bit rate obtained by the encoding control circuit 30. The encoding control circuit 30 finds the encoding bit rate every pre-set time interval based, upon the data amount, in terms of a pre-set unit time duration, of the variable length encoded data, which is the first bitstream obtained by the first variable length encoding circuit, a mean value L and a variance V, in terms of a pre-set unit time interval, of the luminance signal Y of the input picture signals, as found by the picture analysis circuit 60, and a mean value R, in terms of a pre-set unit time interval, of the amount of the motion vectors, data capacity of a picture recording medium 55, such as an optical disc, a magnetic disc or a magnetic tape, or a bit rate (transfer rate) of the transmission channel. In addition, the second encoding circuit 40 quantizes the input picture data with the quantization step size derived from the encoding bit rate when re-processing the input picture data by predictive encoding, DCT, quantization or VLC for generating variable length encoded data as a second bitstream.

Figure 2:
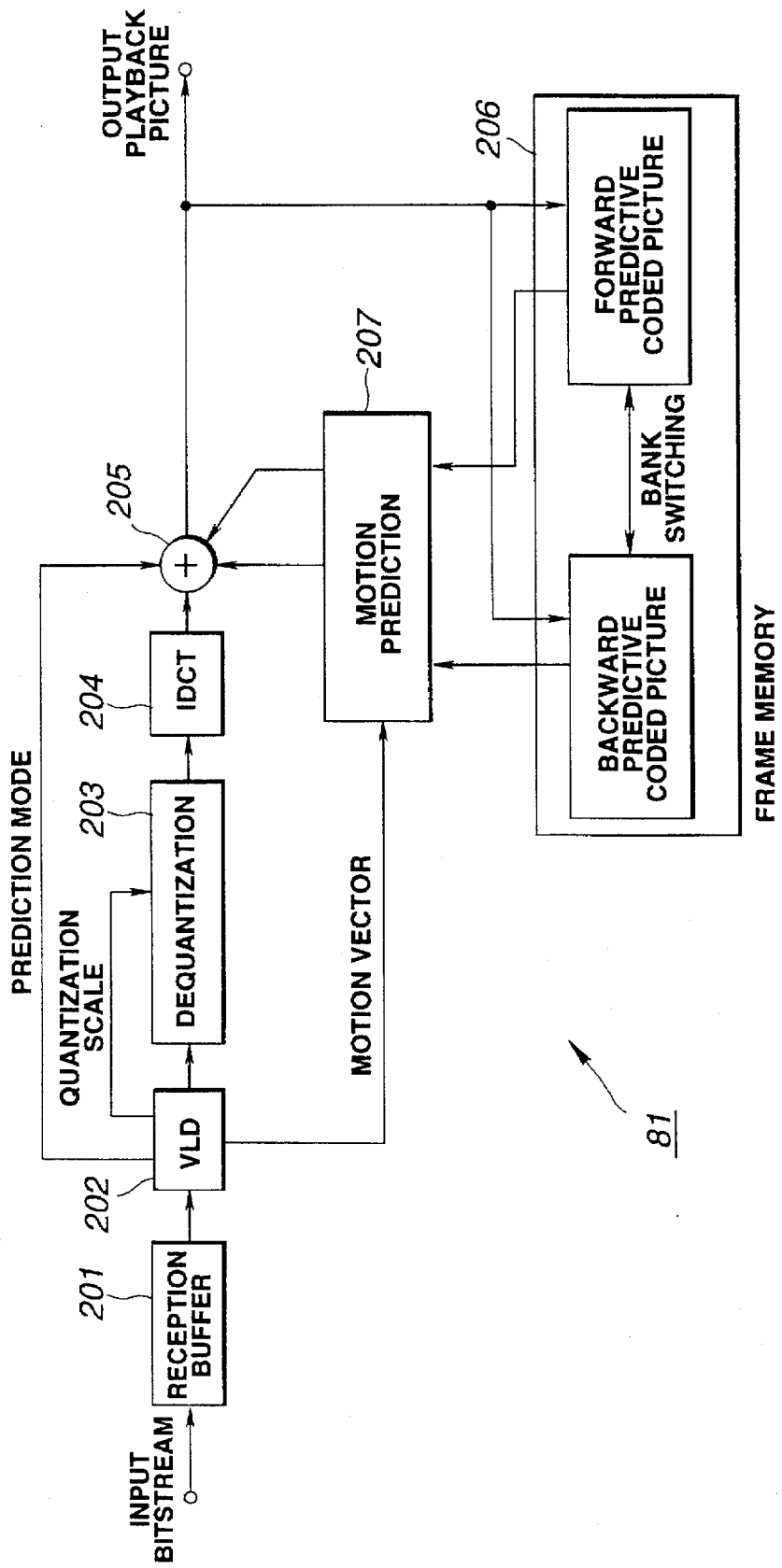
FIG. 2 is a block diagram showing an example of a conventional decoder circuit configuration.

Referring to a flowchart of FIG. 2, an illustrative operation of the first encoding circuit 10 constituting a picture encoding apparatus according to the above-described first embodiment is explained in detail.

Figure 4:
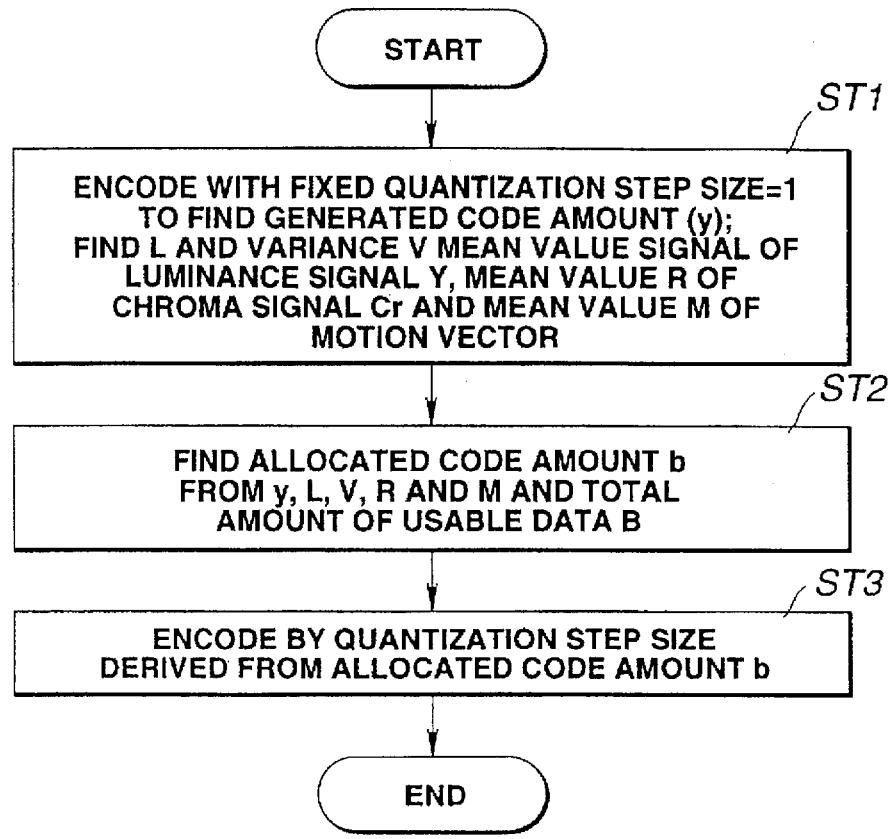
FIG. 4 is a flowchart for illustrating the operation of a first encoding circuit constituting the picture encoding apparatus according to a first embodiment of the present invention.

In the flowchart of FIG. 4, the quantization circuit 16 of the first encoding circuit 10 of FIG. 3 quantizes at step ST1 the coefficient data supplied from the DCT circuit 15, with the quantization step size of, for example, 1, to generate quantized data. A counter 31 of the encoding control circuit 10 counts the data volume of the variable length encoded data obtained by variable length encoding the coefficient data from the DCT circuit 15 (first bitstream), every pre-set time period, for example, every macro-block, to find an amount y of generated codes every macro-block. The picture analysis circuit 60 finds the variance V and the mean value L of the luminance signal Y in the macro-block, mean value R of the chroma signal Cr and the mean value M of the amount of the motion vector of the macro-block.

At the next step ST2, the bit rate calculating circuit 32 finds a code amount b allocated to each macro-block based upon the values y, L, V, R and M and upon the total amount of the usable data B. Specifically, the bit calculation circuit 32 finds the encoding difficulty d based upon the values y, L, V, R and M and finds the amount of the allocated codes b based upon the encoding difficulty d and the total amount of the usable data B.

At step ST3, the quantization circuit 46 of the second encoding circuit 40 quantizes the coefficient data supplied for the DCT circuit 45 with the quantization step size derived from the amount of allocated codes in order to generate quantized data.

Referring to FIG. 3, the operation of the first encoding circuit 10 will be explained in further detail.

The input picture data is transiently stored in the set of frame memories 12 from which the data is read out in accordance with a block format shown in FIG. 5.

The motion vector detection circuit 11 reads out the needed picture data from the set of frame memories 12 on the macro-block basis in order to detect the motion vector. That is, the motion vector detection circuit 11 detects the motion vector of the current reference picture on the macro-block basis, using the forward original picture and/or the backward original picture stored in the set of frame memories 12. In detecting the motion vector, such a motion vector is employed which will give the least value of the sum of the absolute values of the macro-block based inter-frame differences. The motion vector thus detected is supplied to the motion compensation circuits 23 or 53 while the sum of the absolute values of the macro-block based inter-frame differences is supplied to the intra-frame/forward/backward/bi-directional prediction decision circuit 13.

The intra-frame/forward/backward/bi-directional prediction decision circuit 13 sets the prediction mode for the reference block, based upon this value, and controls the prediction encoding circuit 14 for switching between intra-frame/forward/backward/bi-directional prediction in terms of blocks as a unit based upon the thus set prediction mode.

The prediction encoding circuit 14 includes addition circuits 14a, 14b and 14c and a changeover witch 14d, as shown in FIG. 3. The prediction encoding circuit 14 selects the input picture data itself if the encoding mode is an intra-frame encoding mode, while selecting the pixel-based difference data of input picture data for respective prediction pictures if the encoding mode is the forward/backward/bi-directional prediction mode, respectively. The selected data are transmitted to the DCT circuit 15.

The DCT circuit 15 transforms the input picture data or the difference data supplied from the changeover switch 14d by DCT on the block basis, by exploiting two-dimensional correlation of video signals, and transmits the resulting coefficient data to the quantization circuit 16.

The quantization circuit 16 quantizes the coefficient data supplied from the DCT circuit 15, with a pre-set quantization step size, such as with a quantization step size of 1, and transmits the resulting quantized data to the VLC circuit 17 and to the dequantization circuit 18.

The variable length encoding circuit 17 variable length encodes the quantized data along with the quantization step size, prediction mode and the motion vector and transmits the resulting variable length encoded data as the first bit stream to the encoding control circuit 30.

The encoding control circuit 30 includes a counter 31 for counting the data quantity of the variable length encoded data from the VLC circuit 17 every pre-set time interval, and a bit rate calculating circuit 32 for finding the amount of allocated codes per a pre-set time based upon the total amount of the usable data, as shown in FIG. 3. The counter 31 counts the data volume of the first bitstream every pre-set time, for example, every macro-block, and transmits the amount of the generated codes to the bit calculation circuit 32.

The bit rate calculation circuit 32 finds the amount of codes allocated on the macro-block basis, that is the mean encoding rate over the macro-block time, on the basis of the macro-block based amount of the generated codes, the variance V and the mean value L of the luminance signal Y of a given macro-block, the mean value R of the chroma signal Cr of the macro-block, the mean value M of the motion vector of the macro-block, and the total amount of usable data, and transmits the amount of the allocated codes to the quantization scale setting circuit 33 of the second encoding circuit 40.

Specifically, the bit rate calculation circuit 32 calculates the mean bit rate SQBR of a sequence to be encoded, on the basis of the time SQT of the sequence and the total amount of the usable data B, as shown by the equation (1):

$$SQBR = B/SQT \quad (1)$$

The sequence presupposes the totality of frames recorded on a sole recording medium, such as a motion picture or a broadcasting program. If the recording medium is divided into plural portions, the sequence may also be the totality of frames recorded in each divided portion.

The bit rate calculating circuit 32 also finds coefficients $\alpha i$, $\beta i$, $\gamma i$ and $\theta i$, which reflect the subjective impression of a picture pattern from the characteristic of the functions f1, f2, f3 and f4 to the encoding difficulty di, and finds the encoding difficulty di by the products of these coefficients and yi, as shown in the equation 6:

$$\alpha i = f1(Li) \quad (2)$$

$$\beta i = f2(Ri) \quad (3)$$

$$\gamma i = f3(Vi) \quad (4)$$

$$\theta i = f4(Mi) \quad (5)$$

$$di = \alpha i \times \beta i \times \gamma i \times \theta i \times yi \quad (6)$$

Referring to FIGS. 6 to 9, illustrative examples of characteristics of the functions f1, f2, f3 and f4 will be explained.

Figure 6:
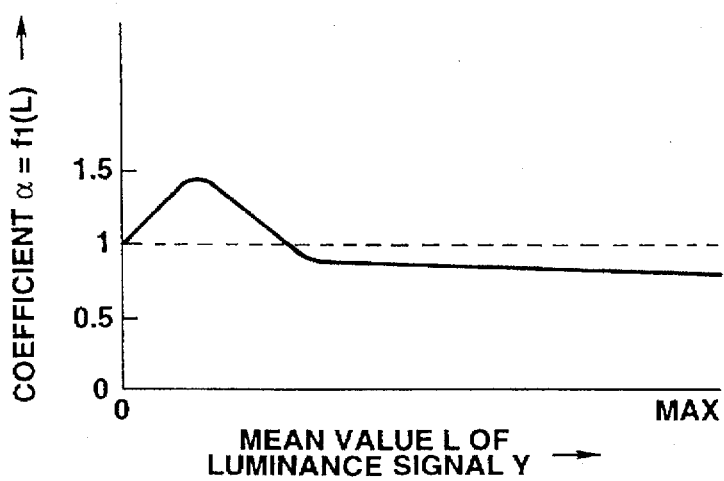
FIG. 6 is a graph showing the relation between the mean value L of the luminance signal Y and a function f1 of a coefficient $\alpha$.

FIG. 6 shows characteristics of the function f1 representing the coefficient $\alpha$ for the mean value L of the luminance signal Y. In FIG. 6, the abscissa denotes the mean value L which is 0 for black and lightest for MAX. In general, the encoding noise is most perceptible to the eye of the human being if a picture is dark. However, if the picture is darker than a pre-set level, the encoding noise becomes hardly perceptible because of excessive darkness. In view of these characteristics, $\alpha$ is set to 1 near L=0, while a has a peak at the level of L for which the deterioration is most perceptible to the eye of the human being. For L larger than this, the value of $\alpha$ is decreased gradually. If $\alpha$ is 1 or larger, the encoding difficulty d is increased, whereas, if $\alpha$ is not more than 1, the encoding difficulty d is decreased. Meanwhile, the mean value of the luminance signal Y for the i'th macro-block is Li and the coefficient $\alpha i$ for this i'th macro-block is f1(Li).

Figure 7:
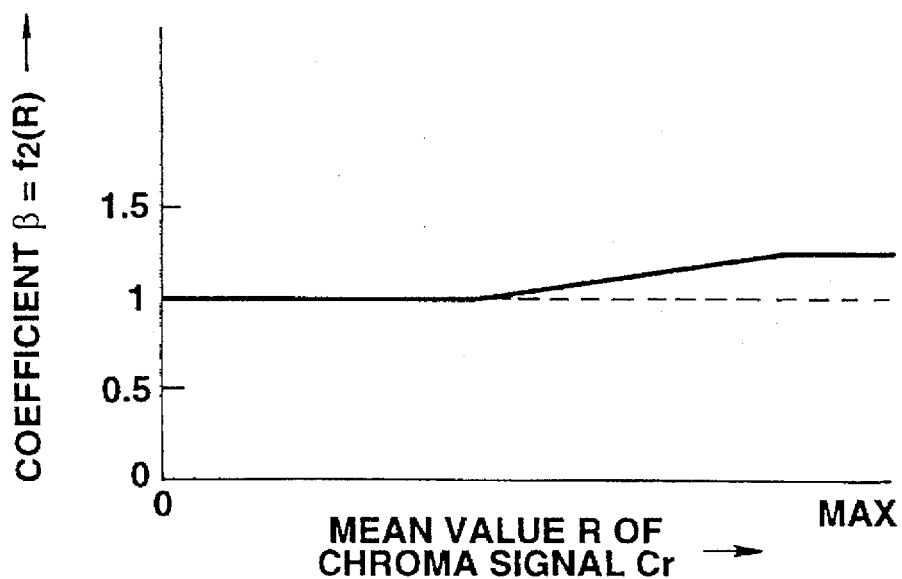
FIG. 7 is a graph showing the relation between the mean value R of the chroma signal CF and a function f2 of a coefficient $\beta$.

FIG. 7 shows characteristics of the mean value R of the chroma signal Cr and the function f2 of the coefficient $\beta$. In the abscissa R of FIG. 7, 0 stands for grey and MAX stands for the pure red value. In general, the human eye is sensitive to deterioration f the red hue. The larger the value of R, the larger the value of $\beta$ is set, with the value of $\beta$ being not less than 1, for increasing the encoding difficulty d. The mean value of the chroma signal Cr for the i'th macro-block is Ri, with the coefficient $\beta i$ for this i'th macro-block being f2(Ri).

Figure 8:
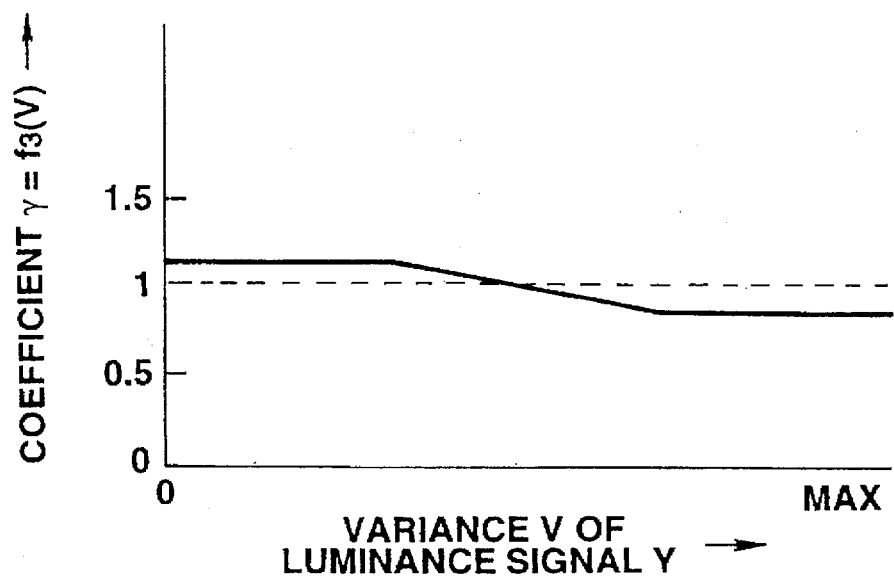
FIG. 8 is a graph showing the relation between the variance V of the luminance signal Y and a function f3 of a coefficient $\gamma$.

FIG. 8 shows characteristics of the variance V of the luminarice signal Y and the function f3 of the coefficient $\gamma$. In FIG. 8, the abscissa denotes V which is flat with 0 and which is most random in picture pattern for MAX. In general, the encoding noise in the flat picture pattern portion is most perceptible to the eye of the human being, while deterioration is imperceptible in a random picture pattern portion. In view of these characteristics, the value of $\gamma$ is of a smaller value less than 1 and the encoding difficulty d is of a smaller value the larger the value of V. The variance Vi of the luminance signal Y for the i'th macro-block is Vi, while the coefficient $\gamma i$ for this i'th macro-block is f3(Vi).

Figure 9:
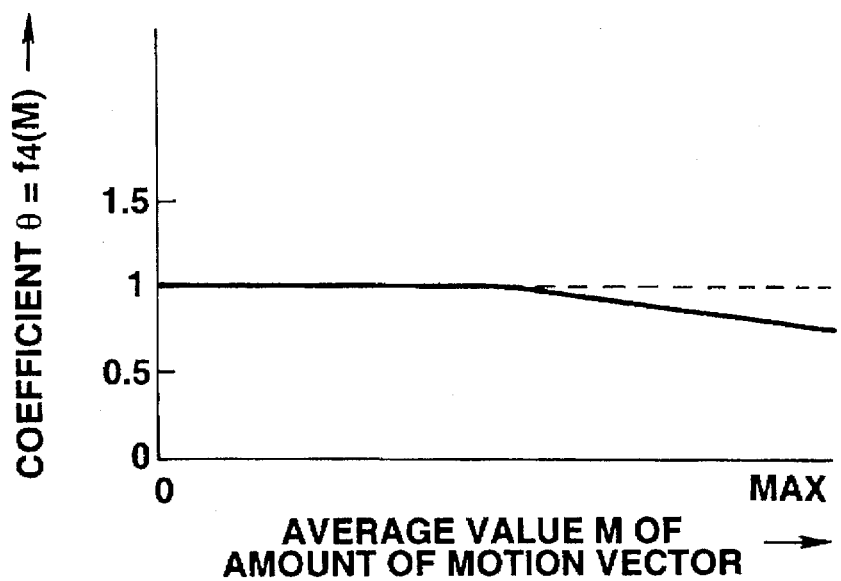
FIG. 9 is a graph showing the relation between the mean value M of the amount of the motion vector and a function f4 of a coefficient $\theta$.

FIG. 9 shows the characteristics of the mean value M of the motion vector amount and the function f4 of the coefficient $\theta$. In FIG. 8, the abscissa denotes M which is 0 if there is no motion and which becomes MAX if the motion is maximum, that is fastest. In general, the eye of the human being cannot follow up with the fast movement, such that picture deterioration becomes hardly perceptible. In view of these characteristics, the larger the value of M, the smaller is to be the value of $\theta$ which is less than unity for decreasing the encoding difficulty d. If the macro-block being considered is intra-frame coded, $\theta = 1$. The mean value of the amount of the motion vector and the coefficient $\theta i$ for the i'th macro-block are Mi and f4(Mi), respectively.

The coefficients $\alpha$, $\beta$, $\gamma$ and $\theta$, thus found, are multiplied by the amount of generated codes y to find a coding difficulty d. As for the i'th macro-block, coefficients $\alpha i$, $\beta i$, $\gamma i$ and $\theta i$ are found and multiplied by the amount of generated codes yi to find the encoding difficulty di.

The bit rate calculation circuit 32 calculates the amount of allocated codes for the i'th macro-block bi by the equation (7):

$$bi = a \times di + c \quad (7)$$

where a, c are constants as set depending upon the mean bit rate SQBR of a sequence.

The amount of allocated codes bi may also be found by a table lookup without employing the linear relation shown in the equation (7).

The equation (7) is now explained.

The equation may be found empirically by tentative encoding of a large number of sequences of moving pictures, for example, many motion pictures, followed by evaluation of the picture quality through a trial-and error process. Usually, the distribution of di in a sequence is as shown in FIG. 10.

Figure 10:
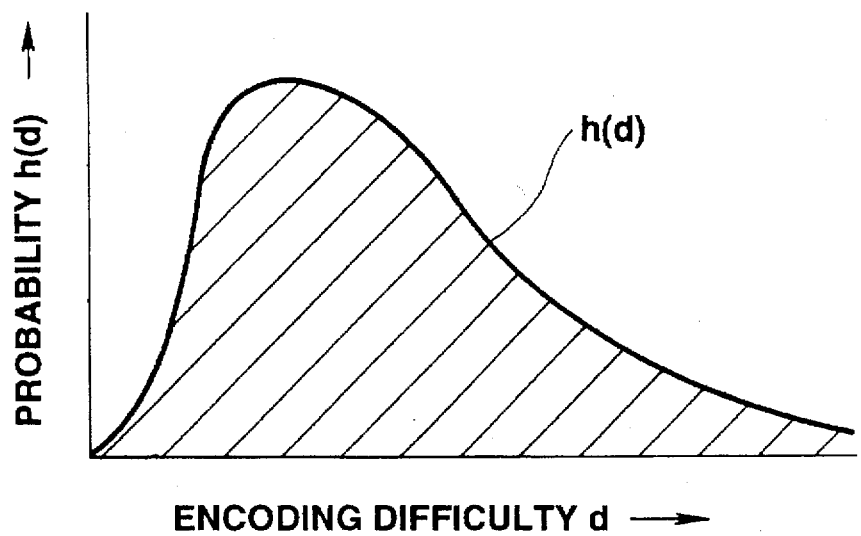
FIG. 10 is a graph showing the distribution of the probability h(d) of appearance of macro-blocks of the encoding difficulty d in a sequence.

In FIG. 10, the abscissa denotes the encoding difficulty d, while the ordinate denotes the probability h(d) of appearance of the encoding difficulty d in a sequence. That is, if the pre-set time unit is a macro-block, the probability h(d) is the frequency of appearance of the macro-blocks with the encoding difficulty d divided by the number of the macro-blocks in the sequence. Thus the area of a hatched portion in FIG. 10 becomes equal to unity.

Figure 11:
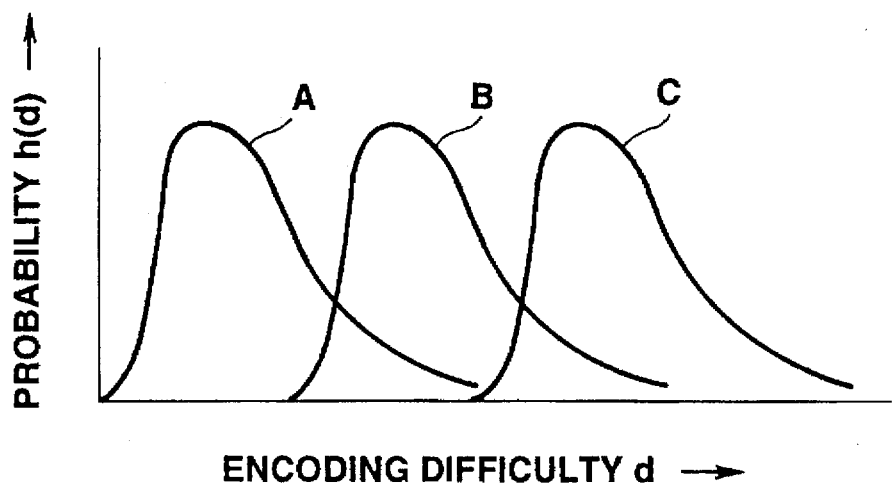
FIG. 11 is a graph showing the distribution of the probability h(d) of appearance of macro-blocks of the encoding difficulty d for low, mid and high values of the mean encoding difficulty.

The relative values of the mean encoding difficulty of several sequences, that is whether the mean encoding sequence of these sequences is higher or lower, may be judged on the basis of the mean value of the encoding difficulty d of each sequence. FIG. 11 shows curves A, B and C of the distribution of the encoding difficulty for three motion pictures having a low value, a mid value and a high value of the mean encoding difficulty. If the values of the encoding difficulty of the i'th macro-blocks of the respective motion pictures associated with these distribution curves A, B and C are denoted by dAi (i=o to N), dBi (i=0 to M) and dCi (i=0 to K), the following equation (8):

$$\sum_{i=0}^{N-1} dAi < \sum_{i=0}^{M-1} dBi < \sum_{i=0}^{K-1} dCi \quad (8)$$

holds.

In this case, the relation of the equation (7) is established on the basis of the distribution curve C for the motion picture having the highest mean encoding difficulty. To this end, the amount b of allocated codes necessary to produce a sufficient picture quality is empirically correlated with the encoding difficulty d within the range of the total number of usable data B. The equation thus produced may be applied to motion pictures of the distribution curves A and B.

More specifically, the amounts of allocated codes bAi, bBi and bCi of the i'th macro-blocks of the motion pictures A, B and C are calculated by the following equations (9), (10) and (11):

$$bAi = a \times dAi + c \quad (9)$$

$$bBi = a \times dBi + c \quad (10)$$

$$bCi = a \times dCi + c \quad (11)$$

The amounts of allocated codes BA, BB and BC for each sequence of the motion pictures A, B and C may be calculated by the following equations (12), (13) and (14):

$$BA = \sum_{i=0}^{N-1} bAi \quad (12)$$

$$BB = \sum_{i=0}^{M-1} bBi \quad (13)$$

$$BC = \sum_{i=0}^{K-1} bCi \quad (14)$$

In this case, the following relation $$BA < BB < BC \quad (15)$$

holds.

That is, if it is desired to record picture signals for a sequence, for example, a motion picture, recording may be made of any motion pictures corresponding to the curves A, B and C without exceeding the capacity of the recording medium by previously preparing the relation of the above distribution curve C.

FIG. 10 shows a distribution curve for the encoding difficulty d of a typical sequence, such as a motion picture, which is to be a reference or model found by tentative encoding of a number of sequences of moving pictures. The mean encoding difficulty of this model may be thought to cover almost all existing sequences of the moving pictures.

Figure 12:
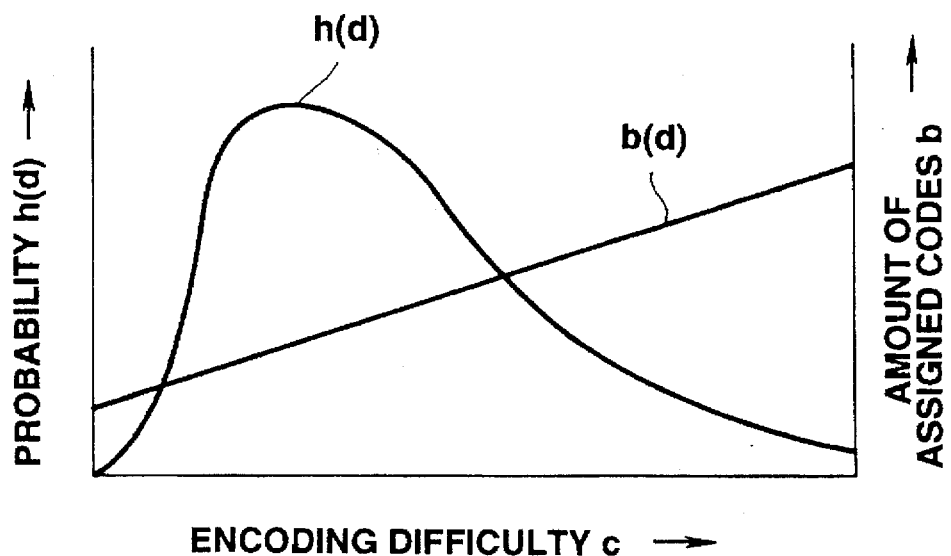
FIG. 12 is a graph showing the distribution of the probability h(d) of appearance of macro-blocks of the encoding difficulty d with respect to the encoding difficulty d.

FIG. 12 shows the relation between the encoding difficulty d and the amount of allocated codes b for a pre-set value of the mean bit rate for an optional sequence SQBR. In FIG. 12, the function b(d) denotes b(d)=a×d+c, which is the generalization of the equation (7), such that the amount of allocated codes bi for the i'th macro-block may be found by bi=a×di+c, where di is the encoding difficulty for the i'th macro-block.

Figure 13:
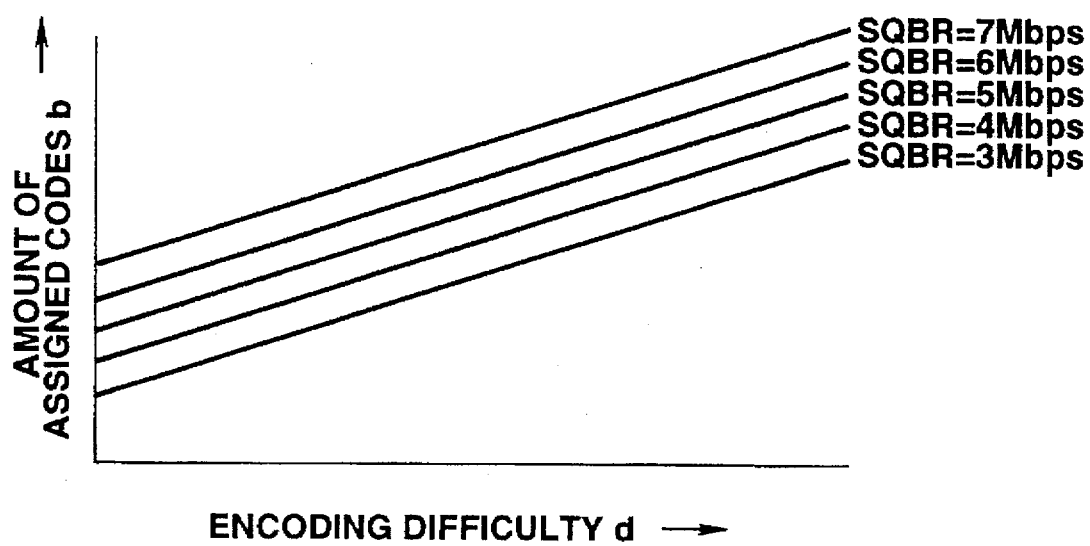
FIG. 13 is a graph showing the relation between the encoding difficulty d and the amount of the allocated codes b with a mean bit rate SQBR as an independent variable.

FIG. 13 shows the relation between the encoding difficulty d per pre-set time period and the amount of the allocated codes b for the mean bit rate for a sequence which herein is an independent variable. In this figure, the mean bit rate SQBR is set to 7 Mbps, 6 Mbps, 5 Mbps, 4 Mbps and 3 Mbps, by way of examples.

The relation corresponding to the equation (7), shown in FIGS. 12 and 13, may be applied to almost all existing sequences within the total amount of the usable data B.

The sum of bi for the totality of macro-blocks making up a slice represents the amount of the allocated codes for the slice. The sum of bi for the totality of macro-blocks making up a frame represents the amount of the allocated codes for the frame. Thus the bit rate calculating circuit 32 increases the amount of the allocated codes for a frame of a complex pattern, while decreasing the amount of the allocated codes for a frame of a simple pattern.

The dequantization circuit 18 dequantizes quantized data supplied from the quantization circuit 16, with a quantization step size of 1, for regenerating coefficient data corresponding to an output of the DCT circuit 15 and which is added to with the quantization distortion. This coefficient data is supplied to the IDCT circuit 20.

The IDCT circuit 20 converts the coefficient data by IDCT to reproduce input picture data corresponding to the output of the predictive encoding circuit 14 for the intra-frame encoding mode, while reproducing difference data for the forward/backward/bidirectional prediction mode and transmitting the reproduced data to the addition circuit 21.

The addition circuit 21 is supplied with motion-compensated prediction picture data from the motion compensation circuit 23 for the intra-frame/forward/backward/bi-directional prediction mode. The addition circuit 21 sums the prediction picture data to the difference data supplied from the IDCT circuit 20 to reproduce picture data corresponding to input picture data.

The picture data, thus reproduced, is stored in the frame memory 22 as prediction picture data. That is, the circuitry from the dequantization circuit 18 to the addition circuit 21 constitutes a local decoding circuit and writes the produced decoded picture in the frame memory 22 as a forward prediction picture or as a backward prediction picture. The set of frame memories 22 is comprised of plural frame memories which are bank-switched so that, for example, a sole frame is outputted as a forward prediction picture data or as a backward prediction picture data depending upon the picture to be encoded. In case of forward/backward bidirectional prediction, forward prediction picture data and backward prediction picture data being outputted are averaged. These prediction picture data are wholly the same picture data as those of picture data reproduced by the picture decoding apparatus as later explained, so that, for the picture processed next time, forward/backward/bi-directional predictive coding is executed on the basis of the prediction picture.

The operation of the second encoding circuit 40 is now explained. Since the circuitry of the second encoding circuit 40 other than the quantization scale setting circuit 33, delay unit 43, quantization circuit 46 and the transmission buffer memory 49, operates in the same manner as the circuitry making up the above-described first encoding circuit 10, the corresponding description is omitted for simplicity.

The delay unit 43 delays the input picture data during the time which elapses until the encoding control signal is outputted from the encoding control circuit 30. In the conventional two-pass system, the delay time not less than a sequence is required as the delay time of the delay unit 43. In the present embodiment, the time on the order of the bit rate switching unit time, for example, the time corresponding to one GOP, suffices as the delay time for the delay unit. The predictive coding circuit 44 and the DCT circuit 45 process the delayed input picture data with predictive encoding and DCT in accordance with the prediction mode supplied from the intra-frame/forward/backward bi-directional prediction decision circuit 13 for generating coefficient data.

The quantization scale setting circuit 33 compares the amount of codes generated in a macro-block detected on buffer feedback from the transmission buffer 49 to the macro-block based amount of allocated codes.

If the amount of the codes allocated to a macro-block under consideration is larger than the macro-block based amount of the allocated codes, the quantization scale setting circuit 33 sets the quantization step size of the next macro-block to a larger value for suppressing the amount of generated codes in the next macro-block. If the amount of the codes allocated to the macro-block under consideration is less than the macro-block based amount of the allocated codes, the quantization step setting circuit 33 sets the quantization step size of the next macro-block to a smaller value for increasing the amount of generated codes in the next macro-block. In this manner, the amount of the generated codes of each macro-block in the second encoding approaches to the amount of codes allocated to the respective macro-blocks. Although the amount of the allocated codes and the amount of the generated codes are controlled to approach to each other on the macro-block basis, it is also possible to effectuate control on the slice basis, on the frame basis or, as later explained, on the GOP (group-of-picture) basis.

In addition, it is possible for the quantization scale setting circuit 33 to increase the quantization step size to suppress the overflow, without regard to the results of comparison of the amount of the allocated codes to the amount of the generated codes, if the buffer feedback from the transmission buffer 49 indicates the impending overflow of the transmission buffer 48. It is similarly possible for the quantization scale setting circuit 33 to decrease the quantization step size to suppress the underflow, without regard to the results of comparison of the amount of the allocated codes to the amount of the generated codes, if the buffer feedback from the transmission buffer 49 indicates the impending underflow of the transmission buffer 48.

Although the amount of the generated codes and the amount of the allocated codes are compared in the above description on the macro-block basis for switching the quantization step size on the macro-block basis, it is possible to effectuate such switching on the slice basis, on the frame basis or on the GOP basis.

Although the amount of generated codes is detected in the above description from the stored amount in the transmission buffer 49, it may also be produced from an output of the VLC circuit 47. The quantization scale circuit 33 transmits the quantization step size, thus set, to the quantization circuit 46.

The quantization circuit 46 quantizes the coefficient data supplied from the DCT circuit 45 in accordance with the quantization step size supplied from the above-described quantization scale setting circuit 33 for generating quantized data.

The VLC circuit 47 variable length encodes the quantized data supplied from the quantization circuit 46 along with the quantization step size from the quantization scale circuit 33, the prediction mode from the intra-frame/forward/backward/bi-directional prediction decision circuit 13 and the motion vector from the motion vector detection circuit 11 and transmits the resulting variable length encoded data as the second bitstream to the transmission buffer 49.

Figure 14:
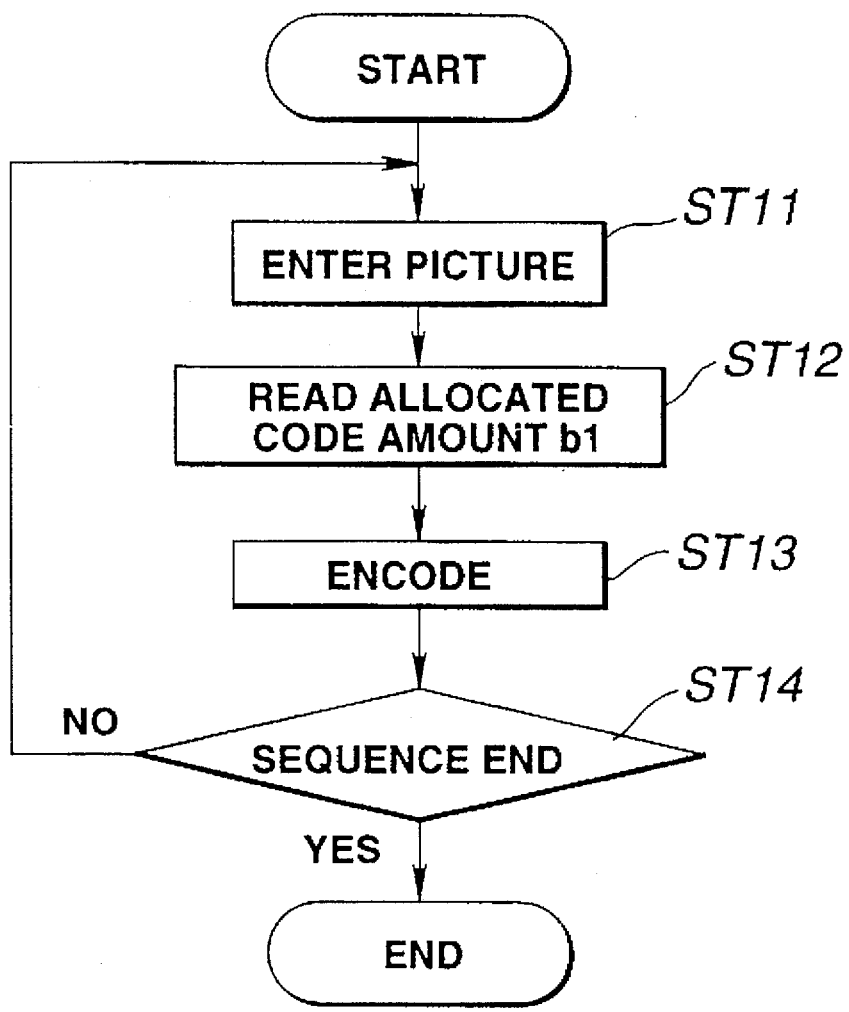
FIG. 14 is a flowchart for illustrating the operation of a second encoding circuit constituting a picture encoding apparatus according to the first embodiment of the present invention.

FIG. 14 schematically shows, in a flowchart, the operation of the second encoding circuit 40 of the picture encoding apparatus.

Referring to FIG. 14, if picture data is entered at step ST11 via delay unit 43, the quantization scale circuit 33 reads the amount of allocated codes for the frame being encoded from the encoding control circuit 30. Processing then transfers to step ST13.

At step ST13, the circuitry from the predictive encoding circuit 44 to the VLC circuit 47 effectuates predictive coding and DCT on the picture data and quantizes coefficient data by the quantization step size derived from the amount of the allocated codes of the macro-block, while quantizing the coefficient data by the quantization step size derived from the amount of the allocated codes for the macro-block and variable length encoding the resulting quantized coefficient data. Processing then transfers to step ST14.

It is judged at step ST14 whether or not encoding of the totality of frames (sequence), to which the same picture size or the same mean bit rate is applied, has come to a close. If the result of judgment is affirmative, the processing comes to a close and, if otherwise, processing reverts to step ST11. Thus the variable length coding in which the encoding rate is varied on the frame basis is achieved, such that, if pictures (frames) with complex patters occur contiguously, the quantization step size is not varied significantly, as was the case with the conventional apparatus, so that a uniform high picture quality may be assured on the whole.

On the other hand, the dequantization circuit 48 dequantizes the quantized data supplied from the quantization circuit 46 with the quantization step size as employed in the quantization circuit 46 for regenerating coefficient data corresponding to the output of the DCT circuit 45 and which is added to with the quantization distortion. The dequantization circuit 48 transmits the resulting coefficient data to the IDCT circuit 50. That is, the circuitry from the dequantization circuit 48 to the addition circuit 51, making up the local decoding circuit, locally decodes quantized data outputted from the quantization circuit 46, and records the resulting decoded picture as the forward prediction picture or as the backward prediction picture in the frame memory 52. The picture data stored in the frame memory 52 is used as a prediction picture for the picture processed next.

If the transmission buffer memory 49, which may be provided optionally, is provided, it transiently stores the variable length encoded data and reads out the stored data at a constant bit rate for smoothing the variable length encoded data and outputting the smoothed data as a bitstream. The output bitstream from the transmission buffer memory 49 is multiplexed with, for example, encoded audio signals and synchronization signals, added to with error correction codes and modulated in a pre-set manner suitable for transmission and recording, so as to be then transmitted over a transmission path to a picture decoding apparatus or recorded on a picture recording medium 55, such as an optical disc, magnetic disc or a magnetic tape, as shown in FIG. 1. That is, since variable length encoding has been done in the second encoding circuit 40 with a larger amount of allocated codes bi and a smaller amount of allocated codes bi for a complex picture and for a simple picture, respectively, it becomes possible to elongate the recording time of the picture recording medium 55, while there is no necessity of applying a generally high fixed rate for evading significant deterioration in picture quality for the picture of complex pattern as was met in the case of the conventional apparatus.

If the transmission buffer memory 49 is not provided, or if a memory of a small capacity is provided, an output bitstream is supplied at a variable bit rate to the picture recording medium 55. By employing a recording apparatus having a variably controllable recording rate and a maximum recording rate exceeding the maximum bit rate of the output bitstream, picture signals of one sequence may be recorded with a data volume which does not exceed the total recording capacity of the recording medium 55 or the total amount of the usable data B. Thus it becomes possible to allocate a larger portion and a smaller portion of the total recording capacity of the picture recording medium 55 to the complex picture and to the simple picture, respectively, for achieving optimum effective utilization of the recording capacity of the recording medium and satisfactory overall picture quality.

It is seen from the above-described embodiment of the present invention that, with the first encoding circuit 10, a standard quantization value is pre-set every pre-set time period for calculating the encoding difficulty and the amount of codes is found by quantizing the DCT coefficients solely by adaptive quantization without managing control based upon the stored volume in the buffer memory. In addition to the volume of the encoding information corresponding to the fixed standard value of quantization, the information associated with picture characteristics, such as lightness, flatness, chromaticity or picture movement, is calculated every pre-set time interval. In such adaptive quantization, the bit rate calculation circuit finds the code amount, allocated every pre-set time interval, such as the mean encoding rate for each frame period, based upon the information associated with the picture characteristics, volume of encoded information and the total amount of the usable data.

For the lightness and flatness of the picture, the mean value L of the luminance signal Y, calculated every pre-set time period, and the variance V of the luminance signal Y, calculated every pre-set time period, may be employed, respectively, whereas, for the chromaticity and the picture movement, the mean value R of the chroma signal Cr, calculated every pre-set time period, and the mean value M of the amounts of the motion vector of the macro-block under consideration, calculated every pre-set time period, may be employed, respectively.

The second encoding circuit 40 sets a target amount of codes for the amount of generated codes, obtained by provisional coding, that is first coding, every pre-set time interval, and controls the quantization step size or the quantization value for encoding a picture. That is, the quantization step size is diminished in a portion of a dark picture where the noise is perceivable more acutely. Similarly, the quantization step size is diminished for a flatter portion or a higher red level portion of a picture. On the other hand, the quantization step size is enlarged for a larger amount of the motion vector, that is for a faster picture movement.

By the above-described encoding, designed for reflecting characteristics of the visual sense of the human being, it becomes possible to prohibit the encoding noise, such as block or mosquito noise, from becoming apparent even in case the subjective impression of the encoded picture is inferior, as in a dark picture portion, red-hued picture portion or a flat picture portion.

If, in the second encoding circuit 40, the amount of the codes generated in the i'th macro-block is b'i, the sum of all amounts b'i must satisfy the following equation (16):

$$B \leq \sum_{i=0}^{16 \cdot 16 - 1} |Yi - Ri| \qquad (16)$$

For decreasing the resulting case of failure, the sum total of the amount of codes allocated by the encoding control circuit 30 can be effectively reduced to be smaller than the actual value of B, for example, to approximately 95% of B. As the case may be, the length of each sequence may be divided into, fop example, four portions, and encoding may be performed in each of these portions with the target amount of codes equal to one-fourth of the value of B.

The above-described signal encoding method and apparatus of the present invention is a so-called one-pass encoder and input signals may be encoded substantially on the real-time basis. In a so-called two-pass encoder, in which all values of the encoding difficulty di for a sequence are previously calculated duping the first encoding, the amount of data allocated to each pre-set time period is found on the basis of the values of the encoding difficulty di and the total amount of usable data, and bit rate control is done during the second encoding responsive to the distribution of the code amounts as found during the first encoding, there is required wait time or delay time equal to at least a sequence since signal input until signal output.

Thus, with the above-described embodiment of the present invention, the transmission bit rate may be generated on the real time basis for almost all existing sequences, so that significant time saving may be realized as compared to the case of using the two-pass encoder.

The one-pass encoding of the present embodiment may also be combined with the conventional two-pass encoding.

That is, although the relation between the amount of allocated codes and the encoding difficulty provided by the encoding control circuit 30 applies to almost all sequences of moving pictures, there may be occasions wherein the above relation cannot cope with some special sequences, such that the equation for a generalized model (7) cannot be met. If such is the case, two-pass encoding may be applied. That is, all values of the encoding difficulty di for a sequence are calculated by the first encoding circuit, the amount of codes allocated per a pre-set time period, for example, the encoding rate averaged over a frame time, on the basis of the encoding difficulty di and the total amount of the usable data, and the bit rate is controlled in the second encoding circuit responsive to the distribution of the code amounts as found by the first encoding.

(2) Second Embodiment

In the above-described first embodiment, the amount of allocated codes per pre-set time, that is the mean encoding rate per pre-set time, is obtained on the macro-block basis. That is, the above pre-set time corresponds to the macro-block. This, however, is not limitative of the present invention. Thus the above pre-set time may correspond to the frame. In this case, a set of parameters yi, Li, Ri, Vi and Mi in the above equations (1) to (5) are calculated with one frame time being set as the above pre-set time. The amount of the allocated codes bi may be found by the equation (5) on the basis of the set of parameters.

In calculating Li, Ri, Vi and Mi in the second embodiment, the mean value over the entire macro-blocks in a frame or the mean value over part of the macro-blocks in a frame, may be employed. The latter method is effective when handling a picture of a letterbox format, that is a format in which upper and lower portions of a frame are masked in black zones for representing a 16:9 picture on a 4:3 format screen. In this case, Li, Ri, Vi and Mi are calculated for macro-blocks constituting an effective mid portion of the picture excluding the upper and lower picture portions masked by black zones. It is possible with this method to comprehend the properties of the effective mid portion of the frame more accurately, and to omit the calculations for the portions masked with the black zones.

With the second encoding circuit 40 of the second embodiment, in contradistinction from the above-described first embodiment, it is necessary to calculate the macro-block based allocated code amount in the quantization scale setting circuit 33. In such case, the quantization scale setting circuit 33 finds the code amount allocated on the macro-block basis from the frame-based amount of the allocated codes bi by dividing the macro-block based amount of the allocated codes bi by the number of the macro-blocks in one frame. The buffer feedback control from the transmission buffer 49 is similar to that in the above-described first embodiment.

Since the amount of allocated codes is found on the basis of the frame in the present second embodiment, the memory volume necessary for storing all bi values may be saved as compared to the above-described first embodiment.

(3) Third Embodiment

In the above embodiments, the amount of allocated bits per pre-set time, that is the mean encoding rate per pre-set time, is produced on the frame basis with the frame being set as the above pre-set time. This, however, is not limitative of the present invention. For example, the GOP (group-of-pictures) in the MPEG (Moving Picture Expert Group) may also be set as the pre-set time. It is noted that the MPEG is the appellation of the moving picture encoding system being searched by the Work Group 11 of the Sub-Committee 29 in Joint Technical Committee (JTC) 1 of International Organization for Standardization (ISO) and International Electrotechnical Commission (IEC).

Figure 15:
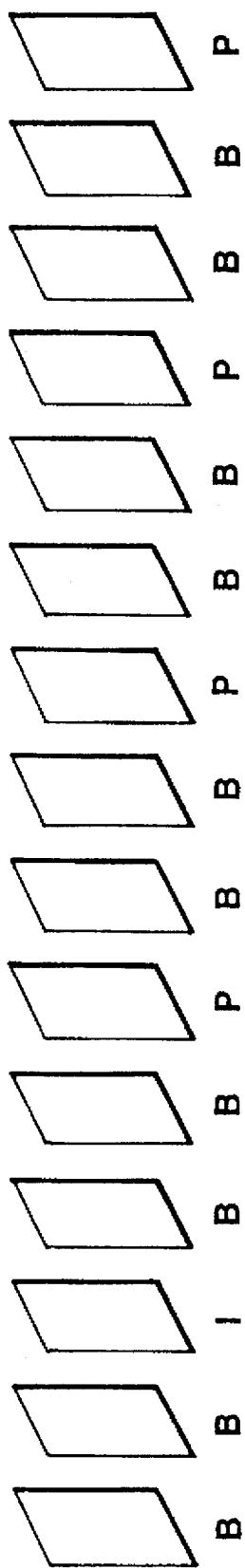
FIG. 15 illustrates plural pictures making up a GOP in MPEG.

In the present third embodiment, each GOP in the MPEG is made up of at least one I-picture and plural P-pictures or B-pictures, that is non-I-pictures. If the GOP is made up of one I-picture, four P-pictures, appearing every three pictures, and ten B-pictures, the encoding controlling circuit 30 finds an amount of allocated codes in terms of a GOP as a unit, as shown in FIG. 15. The I-picture is an intra-field or intra-frame coded picture, while the P-picture is predictable only from the forward direction and coded by inter-frame or inter-field coding, and the B-picture is predictable from the forward and/or backward directions and coded by inter-field or inter-frame coding.

Figure 16:
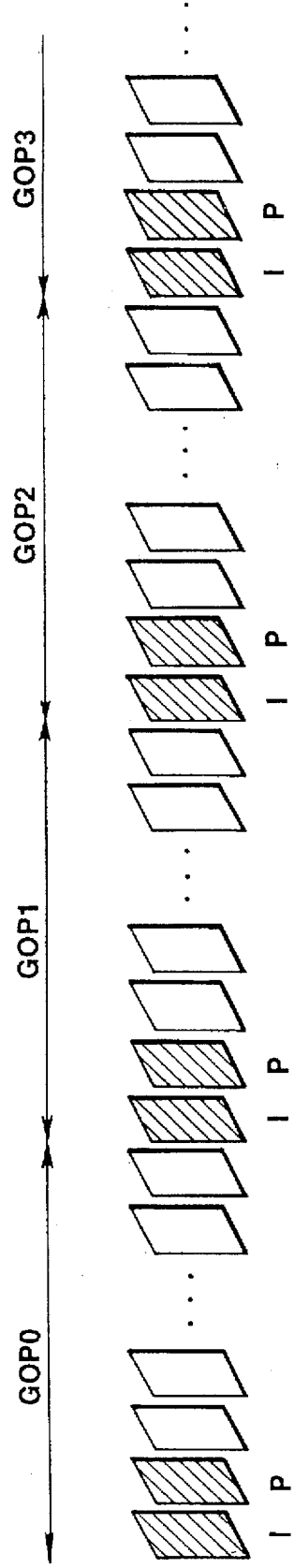
FIG. 16 illustrates plural pictures for illustrating encoding control signals on the GOP basis.

In the first encoding circuit 10, optional two consecutive pictures in a GOP are set as an I-picture and P-picture, with the number of pictures making up the GOP as a period, and picture data of the I-picture and the P-picture are processed with predictive coding, DCT and VLC, with the quantization step being set to, for example, 1, for generating variable length coded data, as shown in FIG. 16. This variable length coded data is supplied to the encoding controlling circuit 30, as shown for example in FIG. 16. The two pictures are set as the I-picture and as the P-picture for checking pattern complexity and inter-frame correlation. Specifically, the pattern complexity may be known from the amount of generated codes of the I-picture, while the inter-frame correlation may be known from the amount of generated codes of the P-picture. Since plural consecutive frames in general have similar pictures, the picture pattern tendency may be comprehended from two extracted pictures.

The encoding control circuit 30 counts an amount of data bitIj of the I-picture and an amount of data bitPj of the P-picture for each GOP, and finds the amount of generated codes GOPyj, based upon these amounts bitIj and bitPj and the number of P-pictures N constituting the GOP, for each GOP, as shown by the equation (6):

$$GOPyj = bitIj + N \times bitPj \quad (17)$$

where j=0, 1, 2,

The encoding control circuit 30 finds the GOP-based amount of allocated codes based upon the GOP-based amount of generated codes GOPyj and the total amount of the usable data and transmits the amount of allocated codes to the second encoding circuit 40.

Specifically, with the total number of GOPs of M, total amount of the usable data B, the amount of generated codes of the j'th GOP of GOPyj, j=0, 1, 2, ... M−1, and a mean value of the amount of motion vector of Mj, coefficients αj, βj, γj and θj, reflecting the subjective impression in coding difficulty GOPdj, are found from functions f1, f2, f3 and f4. The coding difficulty GOPdj is found from the product of these coefficients and GOPdj, as shown in the equation (22):

$$\alpha j = f1(Lj) \quad (18)$$

$$\beta j = f2(Rj) \quad (19)$$

$$\gamma j = f3(Vj) \quad (20)$$

$$\theta j = f4(Mj) \quad (21)$$

$$GOPdj = \alpha j \times \beta j \times \gamma j \times \theta j \times GOPyj \quad (22)$$

The characteristics of the functions f1 to f4 are the same as those shown in FIGS. 6 to 9. The bit rate calculating circuit 32 calculates the amount of the allocated codes GOPbj for the j'th GOP in accordance with the following equation (23):

$$GOPbj = a \times GOPdj + c \quad (23)$$

where a, c are constants as set depending upon the mean bit rate SQBR shown in the above equation (1).

The amount of the allocated codes GOPbj may also be found with table lookup without employing the linear equation shown in FIG. 23.

Thus it is possible for the second encoding circuit 30 to increase the amount of the allocated codes GOPbj for a GOP having pictures with complex patterns or exhibiting low inter-frame correlation and to decrease the amount of the allocated codes GOPbj for a GOP having pictures with simple patterns or exhibiting high inter-frame correlation.

Figure 17:
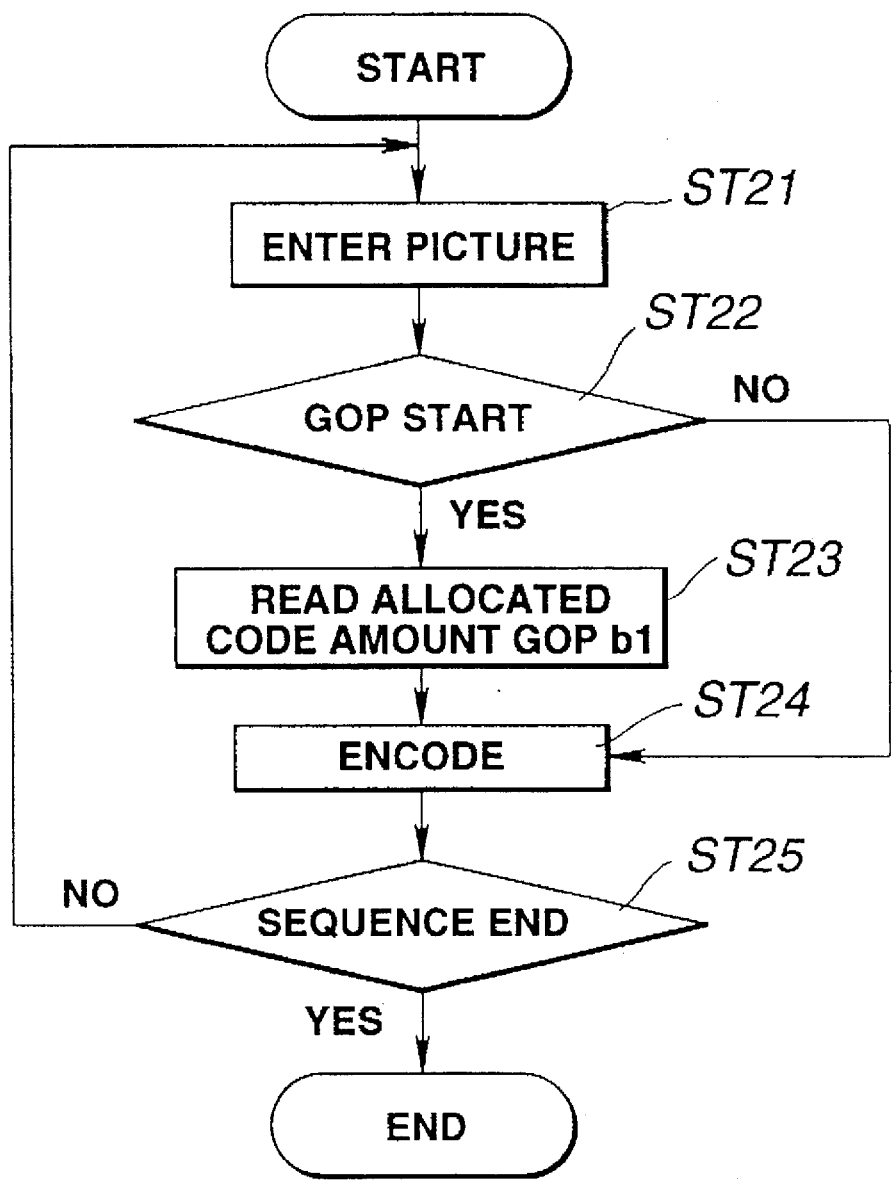
FIG. 17 is a flowchart for illustrating the operation of a second encoding circuit constituting a picture encoding apparatus according to a third embodiment of the present invention.
Figure 18:
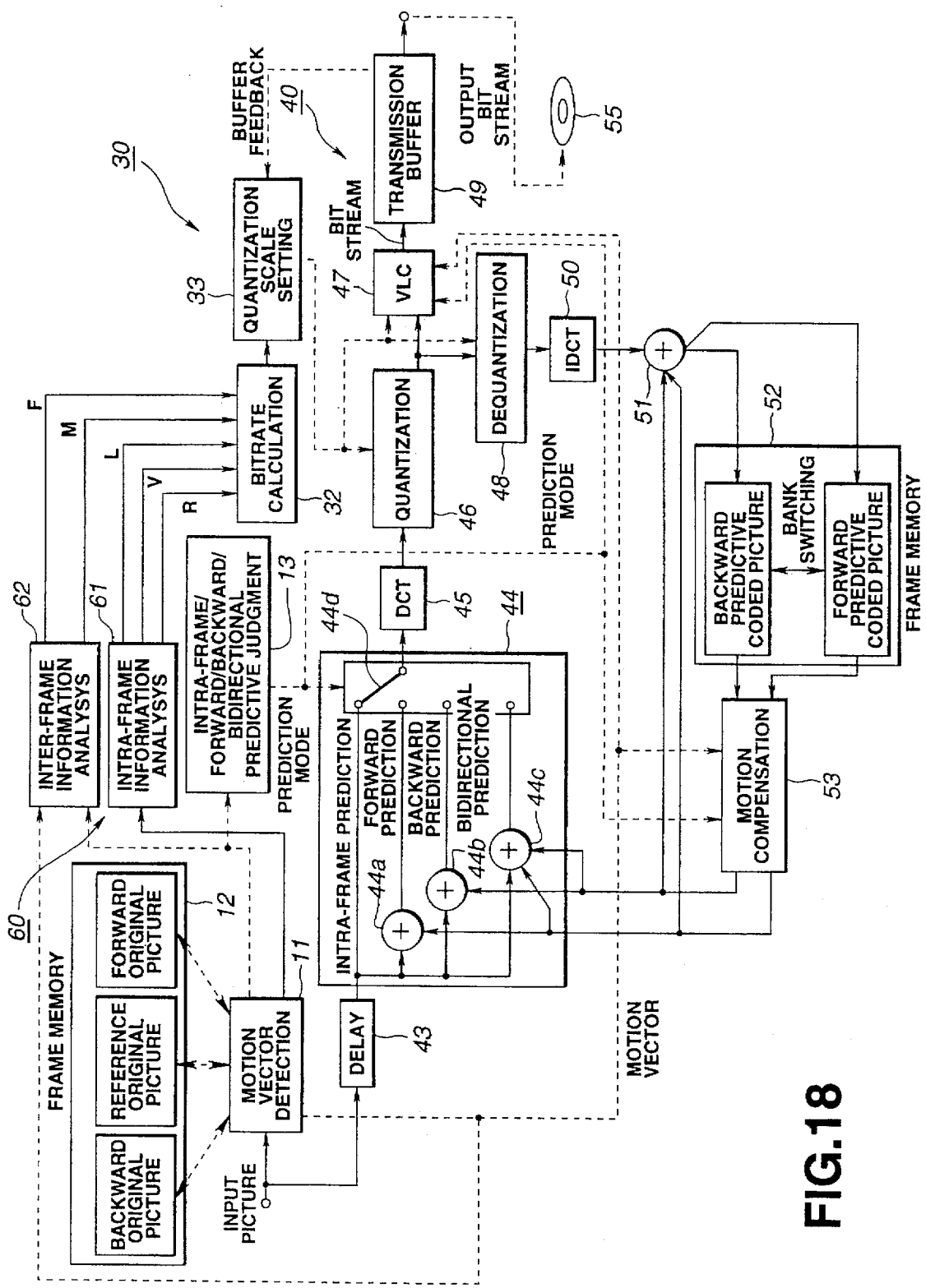
FIG. 18 is a block diagram showing a circuit structure of essential portions of a picture encoding apparatus according to a fourth embodiment of the present invention.

Referring to FIG. 17, if picture data is entered at step ST21 via delay unit 43, the second encoding circuit 40 judges at step ST22 whether or not the picture data currently entered is a leading picture of the GOP. If the result of judgment is affirmative, the second encoding circuit 40 transfers to step ST23 and, if otherwise, transfers to step ST24.

At step ST23, the second encoding circuit 40 reads the amount of the allocated codes for the GOP currently encoded from the encoding control circuit 30. The second encoding circuit 40 then proceeds to step ST25.

At step ST24, the second encoding circuit 40 processes picture data with predictive coding and DCT and, after quantizing the resulting coefficient data with the quantization step size derived from the amount of allocated codes, the second encoding circuit variable length encodes the quantized data. Processing then transfers to step ST25.

The quantization scale setting circuit 33 sets the frame-based amount of allocated codes, from the GOP-based amount of allocated codes, supplied thereto, taking into account the picture types in actual encoding, that is picture types (I-, P- or B-pictures) shown in FIG. 10. The processing downstream of the quantization scale setting circuit 33 is similar to that of finding the frame-based amount of allocated codes, as explained previously.

It is then judged at step ST25 whether or not the encoding for the totality of frames (sequence), to which the same screen size or the same transfer rate is applied, has come to a close. If the result of judgment is affirmative, processing comes to a close and, if otherwise, processing reverts to step ST21. This realizes variable rate encoding in which the encoding rate is varied on the GOP basis, such that the quantization step size for a series of contiguous pictures (frames) of complex picture patterns or frames is not vitally changed as was the case with the conventional device and hence a uniform high picture quality may be achieved on the whole. Since the GOP-based amount of allocated codes is found in the present embodiment based upon two picture sorts, high-speed processing may be achieved as compared to the above-described embodiments. It is of course possible to find the amount of allocated codes for each GOP based upon the amount of data of all pictures in the GOP.

(4) Fourth Embodiment

Referring to FIG. 13, a fourth embodiment of a picture encoding apparatus according to the present invention is explained.

The present fourth embodiment differs from the above-described first to third embodiments in the following two points. That is, the fourth embodiment is devoid of the first encoding circuit 10 of FIG. 3 and differs in the manner of finding encoding difficulty. Second, the fourth embodiment differs as to the operation of the bit rate calculating circuit 32. These points of difference are now explained.

The picture encoding apparatus of the fourth embodiment, shown in FIG. 13, has a picture analysis circuit 60 for finding statistic properties of the input video signals, and an encoding control circuit 30 for finding the encoding rate every pre-set time interval based upon statistic properties of input video signals and the total amount of usable data. The picture encoding apparatus further includes a second encoding circuit 40 encoding the input video signals every pre-set time interval based upon the encoding rate from the encoding control circuit 30 for generating second encoded data.

The picture analysis circuit 60 finds the information derived from the statistic properties of the input video signals or the information on picture characteristics. Among different sorts of the information on picture characteristics, thus calculated, there are an average value R of the chroma signals, calculated every pre-set time interval, the statistic information on chromaticity of the input picture, such as an average value R of the chroma signal CP, calculated every pre-set time interval, the statistic information on flatness of the input picture, such as variance V of the luminance signal Y, calculated every pre-set time interval, the statistic information on the amount of movement of the input picture, such as an average value M of the amount of the motion vector, calculated every pre-set time interval, and the information on inter-picture differences, such as a sum E of absolute values of the inter-picture prediction residuals of the amount of the motion vector, calculated every pre-set time interval.

That is, as the inter-picture prediction residuals of the motion vector, the sum E of absolute values of differences of the luminance signals Ri of a macro-block referred to by the motion vector, shown by the equation (24):

$$E = \sum_{i=0}^{16 \cdot 16 - 1} |Yi - Ri| \qquad (24)$$

is found.

As for E, a square sum may be employed in place of the sum of absolute values.

Figure 19:
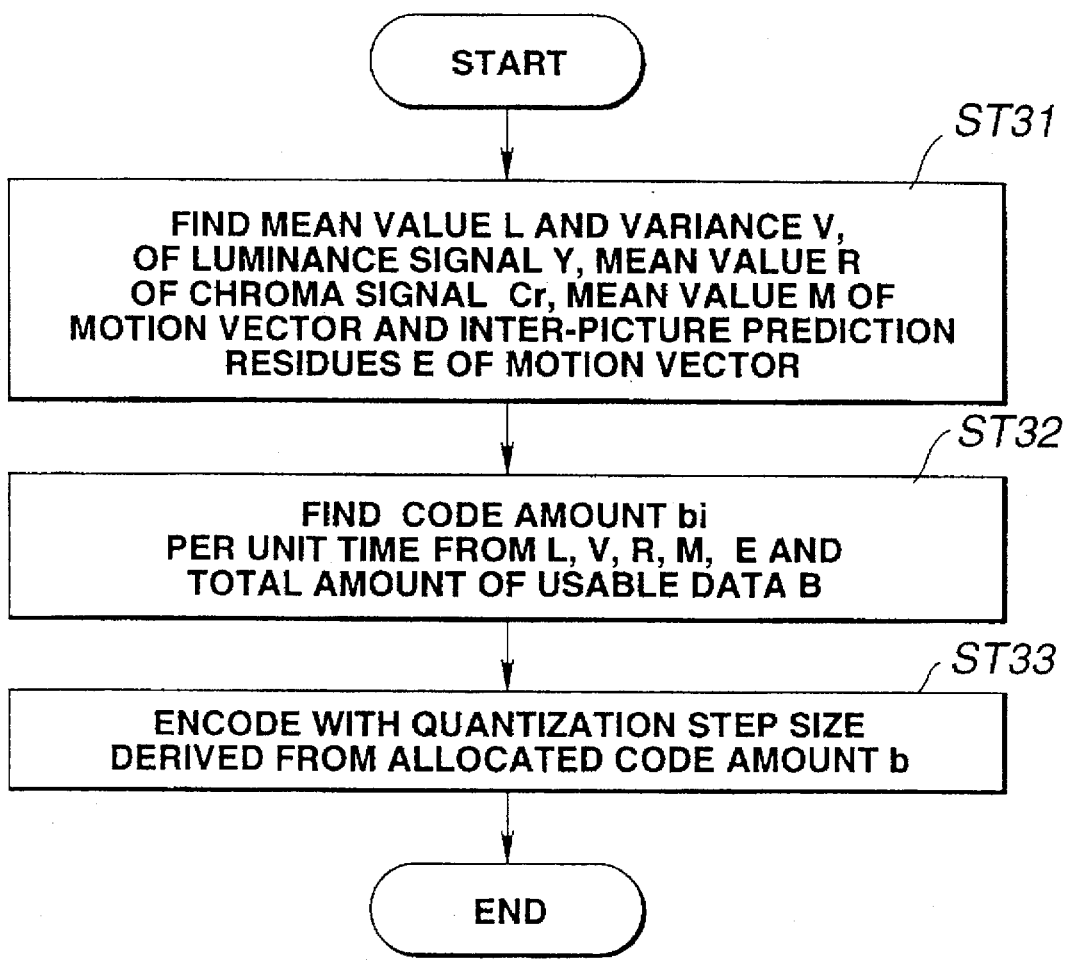
FIG. 19 is a flowchart for illustrating the operation of essential portions of a picture encoding apparatus according to the fourth embodiment of the present invention.

With the present picture encoding apparatus, the information on picture characteristics, which is the information on statistic properties of the input video signals representing the encoding difficulty, herein the average value L and the variance V of the luminance signals Y of the macro-block, the average value R of the chroma signal Cr, the average value M of the motion vector of the macro-block and the sum E of absolute values of inter-picture prediction residuals of the motion vector, are found at step ST31 every pre-set time interval, for example, every macro-block, as shown for example in FIG. 19. If the macro-block is of the intra-coding mode, that is if the macro-block is of an I-picture, it is more preferred to calculate the sum of absolute values of the residuals remaining after separation of the average values in a macro-block than calculating the sum of absolute values of inter-picture prediction residuals of the motion vector.

That is, as the sum of absolute values of residuals left after separation of the average values of a block for the intra-coding mode, the sum E of the absolute values of the differences between the luminance signal Yi of a macro-block being encoded and an average value Yav of the luminance signal Yi in the macro-block is found in accordance with the equation (25):

$$E = \sum_{i=0}^{16 \cdot 16 - 1} |Yi - Aav| \qquad (25)$$

As for E of the equation (25), a square sum, that is the above variance V, may be employed in place of the sum of absolute values.

At the next step ST32, the bit rate calculation circuit 32 calculates the macro-block-based amount of allocated codes on the basis of the average value and the variance of the luminance signals, average value of the chroma signals, average value of the amount of the motion vector, inter-picture prediction residuals of the motion vector or the residuals left after subtracting average values from the luminance signals, and the total amount of the usable data.

At the next step ST33, the quantization circuit 46 of the encoding circuit 40 quantizes coefficient data supplied from the DCT circuit 45 with the quantization step size derived from the amount of allocated data in order to generate quantized data.

The illustrative operation of the bit rate calculating circuit 32 is now explained. That is, with the total number of macro-blocks of a sequence of N, the average value Li of the luminance signal Y of the i'th macro-block, i=0, 1, 2, ... N−1, the variance of Vi, the average value of the chroma signal Cr of Ri and the average value of the amount of the motion vector of Mi, the bit rate calculating circuit 32 finds coefficients αj, βj, γj and θj, reflecting the subjective impression on coding difficulty, from the characteristics of the functions f1, f2, f3 and f4. The bit rate calculating circuit 32 also empirically estimates an amount y'i of generated codes in a macro-block, corresponding to yi in the first embodiment, from the characteristics of the function f6, on the basis of the sum E of absolute values of the inter-picture prediction residuals of the motion vector, and finds the encoding difficulty di, from the product of the coefficients αj, βj, γj and θj with the estimated value y'i of the amount of the generated codes, as shown by the equation (31):

$$\alpha i = f1(Li) \tag{26}$$

$$\beta i = f2(Ri) \tag{27}$$

$$\gamma i = f3(Vi) \tag{28}$$

$$\theta i = f4(Mi) \tag{29}$$

$$y'i = f6(Ei) \tag{30}$$

$$di = \alpha i \times \beta i \times \gamma i \times \theta i \times y'i \tag{31}$$

Figure 20:
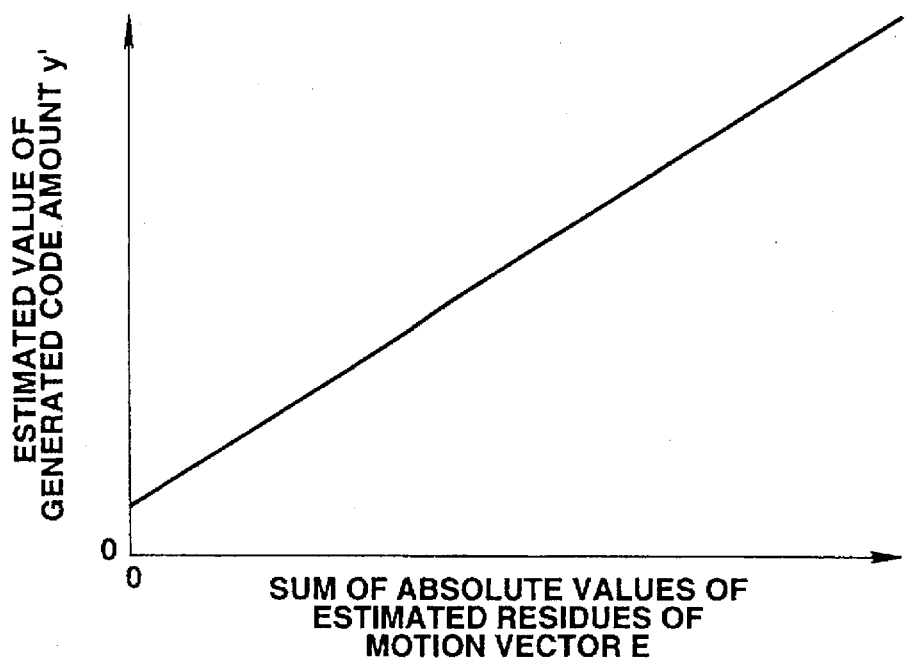
FIG. 20 is a graph showing the relation between the inter-picture prediction residuals of a motion vector and a function f6 of an estimated value y'i of the macro-block based amount of generated codes.

The illustrative characteristics of the functions f1 to f4 may be those shown in FIGS. 6 to 9. FIG. 20 shows a typical example of the function f6. That is, FIG. 20 shows an estimated value y' of the macro-block based amount of generated codes against the inter-picture prediction residues of the motion vector. The results of experiments indicate that E is substantially proportional to y', such that the estimated value y'i of the amount of the generated codes for the inter-picture prediction residual Ei of the motion vector of the i'th macro-block becomes f6(Vi).

If the macro-block to be encoded is of the intra-coding mode, it is preferred to use the sum of absolute values of the residuals obtained after separation of the average values of the luminance signals in the macro-block, or the variance V, in which case the estimated value y'i of the amount of the generated codes Of the macro-block is obtained from the characteristics of the function f5 based upon the variance Vi of the luminance signal Y. That is, $$y'i = f5(Vi) \tag{32}$$

Figure 21:
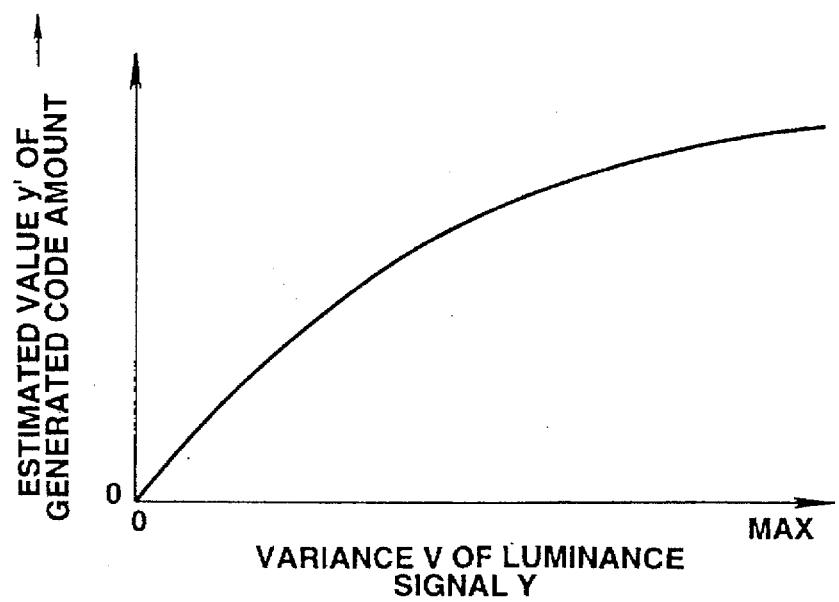
FIG. 21 is a graph showing the relation between the variance V of the luminance signal Y and a function f5 of an estimated value y'i of the macro-block based amount of generated codes.

FIG. 21 shows a typical example of the function f5(Vi).

FIG. 21 shows the estimated value y' of the macro-block-based amount of the generated codes against the variance V of the luminance signal Y. The estimated value y'1 of the amount of generated codes for the variance Vi of the luminance signal Y of the i'th macro-block is f5(Vi).

As in the first embodiment, described above, the bit rate calculation circuit calculates the amount of code allocation to the i'th macroblock fop the encoding difficulty di by the equation (33):

$$bi = a \times di + c \tag{33}$$

This equation 33 is empirically found by tentative coding of a number of sequences of moving pictures, such as motion pictures and evaluating the picture quality by a trial-and-error process, and represents a general formula applicable to almost all existing sequences. The equation may be formulated in a manner similar to formulation of the equation 7 explained in connection with the first embodiment.

Thus the bit rate calculation circuit 32 increases the amount of allocated codes fop frames having a complex picture pattern while decreasing the amount of allocated codes for pictures of a simple pattern.

The operation of the encoding circuit 40 is similar to that of the second encoding circuit 40 explained in connection with the first embodiment and hence is not explained for brevity.

In the above-described embodiment, the macro-block time is the pre-set time period, and the amount of allocated bits per re-set unit time unit bi is obtained on the macro-block basis. However, the pre-set time unit may also be a frame or a group-of-picture (GOP). In this case, it suffices to calculate respective parameters, namely the mean value Li and the variance Vi of the luminance signals Y, mean value Ri of the chroma signals Cr and the mean value Mi of the amount of motion vector, every pre-set time period, to calculate inter-picture prediction residuals of the motion vector or the sum of absolute values of residuals left after subtraction of the mean value from the luminance signals every pre-set unit time and to calculate the encoding difficulty every pre-set unit time for calculating the amount of code allocation every pre-set unit time, as shown in the above equation 19.

The present invention is not limited to the above-described illustrative embodiments. For example, so-called strato-transform, Haal transform or wavelet transform may be used as transform coding instead of DCT as used in the above embodiment. The signals handled may also be audio signals, in addition to picture signals or video signals, and may be applied to encoding of title data or character data. If he present invention is applied to encoding of audio signals, the encoding difficulty may be found based upon acoustic statistic information and occasionally upon the amount of generated codes per unit pre-set time obtained on first encoding.

It is seen from the above explanation that, according to the present invention, the encoding difficulty pep pre-set unit time, previously standardized by the general types of input signals to which belong the input signals is correlated with the amount of allocated codes, and the encoding difficulty per pre-set time of the input signals correlated with the encoding difficulty of the input signals per unit time is found. Based on this amount of allocated codes, the input signal is encoded every pre-set time period for generating encoded data. Thus the encoding may be performed with an optimum amount of allocated codes responsive to signal complexity substantially on the real time basis.

By finding the encoding difficulty on the basis of the data amount per pre-set unit time of the encoded data generated by encoding at least a part of the input signals, encoded data of high uniform quality may be obtained without excessively increasing the quantization step size even if complex signals occur consecutively.

If the input signals are picture signals, the encoding difficulty is found on the basis of the information of picture characteristics pep preset unit time of input video signals, and use is made of a mean value per pre-set unit time of luminance signals as the picture luminance information, a mean value per unit pre-set time of chroma signals as the chroma information, a variance value of luminance signals as the flatness information, a mean value per pre-set unit time of the motion vector amount of the macro-block as the picture movement information and a sum per pre-set unit time of the amounts of motion vector of macro-blocks as the inter-picture differences, for encoding at an encoding rate reflecting the visual sense of the human being by the information on picture characteristics.

What is claimed is:

1. A method for encoding video signals comprising the steps of:

generating the information on picture characteristics at least including the luminance information of the input video signals per a pre-set time interval as a unit;

calculating the mean bit rate of said input video signals;

calculating the information on the amount of bits generated per said pre-set time interval of the input video signals;

calculating the encoding difficulty per said pre-set time interval based upon the information on picture characteristics, information on the amount of generated bits and the information on the total amount of data usable for transmission of encoded data;

determining the encoding bit rate per said pre-set time interval by applying the encoding difficulty to a function designed for finding the encoding bit rate pre-set by said mean bit rate; and encoding the input video signals in accordance with the encoding bit rate obtained per said pre-set time interval.

2. The method for encoding video signals as claimed in claim 1 wherein said information on the amount of generated bits is found based upon the amount of data per said pre-set time interval of the encoded data generated by encoding at least a part of the input video signals.

3. The method for encoding picture signals as claimed in claim 2 wherein said information on picture characteristics is found by calculating at least one of picture luminance, chromaticity, flatness and picture movement every pre-set time interval.

4. The method for encoding picture signals as claimed in claim 3 wherein the information on picture characteristics includes an average value of luminance signals as the information on picture luminance over the pre-set time interval, an average value of chroma signals as the chromaticity information over the pre-set time interval, a variance of the luminance signal as the information on flatness and an average value of the amount of motion vector of macroblocks as the picture movement information over the pre-set time interval.

5. The method for encoding picture signals as claimed in claim 3 wherein the information on the amount of bits of the input video signals generated per pre-set time interval is estimated from the inter-picture difference information represented by the square sum or the sum of absolute values per pre-set time interval of prediction residuals between pictures referred to in finding the picture movement.

6. An apparatus for encoding video signals comprising:

means for generating the information on picture characteristics at least including the luminance information of the input video signals per a pre-set time interval as a unit;

means for calculating the mean bit rate of said input video signals;

means for calculating the information on the amount of bits generated per said pre-set time interval of the input video signals;

means for calculating the encoding difficulty per said pre-set time interval based upon the information on picture characteristics, information on the amount of generated bits and the information on the total amount of data usable for transmission of encoded data;

means for determining the encoding bit rate per said pre-set time interval by applying the encoding difficulty to a function for finding the encoding bit rate pre-set by said mean bit rate; and means for encoding the input video signals in accordance with the encoding bit rate obtained per said pre-set time interval.

7. The apparatus for encoding video signals as claimed in claim 6 wherein said information on the amount of generated bits is found on the basis of the amount of data per pre-set time of encoded data generated by encoding at least a portion of the input video information.

8. The apparatus for encoding picture signals as claimed in claim 6 wherein said information on picture characteristics is found by calculating at least one of the information on chromaticity of the picture, the information on flatness of the picture and the information on the movement of the picture every pre-set time interval.

9. The apparatus for encoding picture signals as claimed in claim 6 wherein the information on picture characteristics includes an average value of luminance signals as the information on picture luminance over the pre-set time interval, an average value of chroma signals as the chromaticity information over the pre-set time interval, a variance of the luminance signal as the information on flatness and an average value of the amount of motion vector of macroblocks as the picture movement information over the pre-set time interval.

10. The apparatus for encoding picture signals as claimed in claim 8 wherein the information on the amount of bits of the input video signals generated pep pre-set time interval is estimated from the inter-picture difference information represented by the square sum or the sum of absolute values per pre-set time interval of prediction residuals between pictures referred to for finding the picture movement.

11. A recording medium having recorded thereon encoded data and the quantization step size, said encoded data and the quantization step size being obtained by an encoding method for encoding video signals comprising the steps of: generating the information on picture characteristics at least including the luminance information of the input video signals per a pre-set time interval as a unit, calculating the mean bit rate of said input video signals, calculating the information on the amount of bits generated per said pre-set time interval of the input video signals, calculating the encoding difficulty per said pre-set time interval based upon the information on picture characteristics, information on the amount of generated bits and the information on the total amount of data usable for transmission of encoded data, determining the encoding bit rate per said pre-set time interval by applying the encoding difficulty to a function designed for finding the encoding bit rate pre-set by said mean bit rate, and encoding the input video signals in accordance with the encoding bit rate obtained per said pre-set time interval, said step of encoding comprising a sub-step of calculating a block-based encoding bit rate from said encoding bit rate, a sub-step of comparing said block-based encoding bit rate to a bit rate generated on the block basis, a sub-step of controlling the quantization step size of the block to be encoded next, and a sub-step of encoding said input video signal using the quantization step size for generating said encoded data.

* * * * *